United States Patent
Bachbut et al.

(10) Patent No.: US 11,006,353 B2
(45) Date of Patent: May 11, 2021

(54) LOCATION ACCESS UNITS (LAUS) IN A WIRELESS COMMUNICATIONS SYSTEM (WCS) FOR TRANSMITTING INFORMATION TO A WIRELESS CLIENT DEVICE IN THE WCS FOR DETERMINING LOCATION OF THE CLIENT DEVICE, AND RELATED SYSTEMS AND METHODS

(71) Applicant: Corning Optical Communication LLC, Charlotte, NC (US)

(72) Inventors: Liav Bachbut, Kfar Yona (IL); Aravind Chamarti, Ashburn, VA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/598,666

(22) Filed: Oct. 10, 2019

(65) Prior Publication Data

US 2020/0053639 A1 Feb. 13, 2020

Related U.S. Application Data

(63) Continuation of application No. 15/869,464, filed on Jan. 12, 2018, now abandoned.

(Continued)

(51) Int. Cl.
*H04W 48/16* (2009.01)
*H04W 48/10* (2009.01)
(Continued)

(52) U.S. Cl.
CPC .......... *H04W 48/16* (2013.01); *H04W 4/023* (2013.01); *H04W 48/10* (2013.01); *H04W 48/12* (2013.01);
(Continued)

(58) Field of Classification Search
CPC ..... H04W 48/16; H04W 4/023; H04W 48/10; H04W 48/12; H04W 64/003; H04W 72/0406
(Continued)

(56) References Cited

U.S. PATENT DOCUMENTS 8,831,507 B2 9/2014 Murray et al.
9,204,257 B1 12/2015 Mendelson
(Continued)

OTHER PUBLICATIONS

Non-Final Office Action for U.S. Appl. No. 15/869,464, dated Jan. 11, 2019, 13 pages.
(Continued)

*Primary Examiner* — Chuck Huynh
(74) *Attorney, Agent, or Firm* — C. Keith Montgomery

(57) ABSTRACT

Location access units (LAUs) in a wireless communications system (WCS) for transmitting information to a wireless client device in a WCS for determining location of wireless client device. The LAUs each include a transmitter(s) configured to transmit local wireless communications signal that includes identification information of the LAU, to a wireless client device in the WCS. This identification information can be used to associate the location of the LAU to the client device, because the client device is known to be in communication range of the LAU. In one example, the carrier of a communication session with a client device in the WCS can instruct the client device to scan for local wireless communications signals transmitted by an LAU. The client device
(Continued)

returns received identification information from received wireless communications signals transmitted by an LAU to the carrier to associate this location of the LAU to the client device.

24 Claims, 13 Drawing Sheets

Related U.S. Application Data

(60) Provisional application No. 62/447,663, filed on Jan. 18, 2017.

(51) Int. Cl.
*H04W 48/12* (2009.01)
*H04W 4/02* (2018.01)
*H04W 72/04* (2009.01)
*H04W 64/00* (2009.01)
*H04W 8/00* (2009.01)
*H04W 8/02* (2009.01)

(52) U.S. Cl.
CPC ..... *H04W 64/003* (2013.01); *H04W 72/0406* (2013.01); *H04W 8/005* (2013.01); *H04W 8/02* (2013.01)

(58) Field of Classification Search
USPC .......................................................... 455/434
See application file for complete search history.

(56) References Cited

U.S. PATENT DOCUMENTS

| 2015/0327010 | A1* | 11/2015 | Gottschalk | H04W 4/021 |
| | | | | 455/456.1 |
| 2016/0183351 | A1 | 6/2016 | Snyder et al. | |
| 2016/0330769 | A1 | 11/2016 | Edge | |
| 2017/0099584 | A1 | 4/2017 | Bhanot et al. | |
| 2018/0096543 | A1 | 4/2018 | Chamarti | |

OTHER PUBLICATIONS

Final Office Action for U.S. Appl. No. 15/869,464, dated Jul. 10, 2019, 15 pages.

\* cited by examiner

LOCATION ACCESS UNITS (LAUS) IN A WIRELESS COMMUNICATIONS SYSTEM (WCS) FOR TRANSMITTING INFORMATION TO A WIRELESS CLIENT DEVICE IN THE WCS FOR DETERMINING LOCATION OF THE CLIENT DEVICE, AND RELATED SYSTEMS AND METHODS

CROSS-REFERENCE TO RELATED APPLICATIONS

This application is a continuation of U.S. application Ser. No. 15/869,464, filed Jan. 12, 2018, which claims the benefit of priority under 35 U.S.C. § 119(e) of U.S. Provisional Application Ser. No. 62/447,663 filed on Jan. 18, 2017, the content of which is relied upon and incorporated herein by reference in its entirety.

BACKGROUND

The technology of the present disclosure relates generally to locating client devices in a wireless communications system (WCS), such as a distributed antenna system, and more particularly to providing dedicated location access units (LAUs) associated with remote units deployed in the WCS, wherein the LAUs are configured to provide location information based on receiving local wireless communications signals from devices having known locations and/or pressure information associated with the environment of the remote unit, to then associate such location information with client devices communicating with a remote unit.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Wireless communications systems (WCS) communicate with wireless devices called "clients," "client devices," or "wireless client devices," which reside within the wireless range or "cell coverage area" in order to communicate with an access point device. One example of a WCS is a distributed antenna system (DAS). DASs are particularly useful to be deployed inside buildings or other indoor environments where client devices may not otherwise be able to effectively receive radio-frequency (RF) signals from a source, such as a base station for example. Example applications where DASs can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates an example of distribution of communications services in a WCS. FIG. 1 illustrates a WCS that is configured to distribute wireless communications services to coverage areas 100(1)-100(N) in the form of a DAS 102, wherein 'N' is the number of coverage areas. These communications services can include cellular services, wireless services such as RFID tracking, Wireless Fidelity (WiFi), local area network (LAN), WLAN, and combinations thereof, as examples. The coverage areas 100(1)-100(N) may be remotely located. In this regard, the remote coverage areas 100(1)-100(N) are created by and centered on remote antenna units 104(1)-104(N) connected to a central unit 106 (e.g., a head-end controller or head-end unit). The central unit 106 may be communicatively coupled to a base station 108. In this regard, the central unit 106 receives downlink communications signals 110D from the base station 108 to be distributed to the remote antenna units 104(1)-104(N). The remote antenna units 104(1)-104(N) are configured to receive downlink communications signals 110D from the central unit 106 over a communications medium 112 to be distributed to the respective coverage areas 100(1)-100(N) of the remote antenna units 104(1)-104(N). Each remote antenna unit 104(1)-104(N) may include an RF transmitter/receiver (not shown) and a respective antenna 114(1)-114(N) operably connected to the RF transmitter/receiver to wirelessly distribute the communications services to client devices 116 within their respective coverage areas 100(1)-100(N). The remote antenna units 104(1)-104(N) are also configured to receive uplink communications signals 110U from the client devices 116 in their respective coverage areas 100(1)-100(N) to be distributed to the base station 108. The size of a given coverage area 100(1)-100(N) is determined by the amount of RF power transmitted by the respective remote antenna unit 104(1)-104(N), the receiver sensitivity, antenna gain and the RF environment, as well as by the RF transmitter/receiver sensitivity of the client device 116. Client devices 116 usually have a fixed RF receiver sensitivity, so that the above-mentioned properties of the remote antenna units 104(1)-104(N) mainly determine the size of their respective remote coverage areas 100(1)-100(N).

As noted above, it may be desired to provide the DAS 102 indoors, such as inside a building or other facility, to provide indoor wireless communication for clients. Otherwise, wireless reception may be poor or not possible for the client devices 116 located inside the building. While extending the remote antenna units 104(1)-104(N) to locations in the building can provide seamless wireless coverage to the client devices 116, other services may be negatively affected or not possible due to the indoor environment. For example, it may be desired or required to provide localization services for the client devices 116, such as emergency 911 (E911) services as an example. If the client devices 116 are located indoors, techniques such as global positioning services (GPS) may not be effective at providing or determining the location of the client devices 116. Further, triangulation and/or trilateration techniques from the outside network may not be able to determine the location of the client devices 116.

No admission is made that any reference cited herein constitutes prior art. Applicant expressly reserves the right to challenge the accuracy and pertinency of any cited documents.

SUMMARY

Embodiments disclosed herein include location access units (LAUs) in a wireless communications system (WCS)

for transmitting information to a wireless client device in the WCS for determining location of the wireless client device in the WCS. Related systems and methods are also disclosed. For example, a WCS may be an indoor wireless communications system that includes remote units for distributing communications services to indoor remote coverage areas. It may be desired or necessary to determine the location of wireless client devices communicating within the WCS, such as for emergency 911 (E911) services for example. In this regard, in certain aspects disclosed herein, LAUs are deployed in the WCS. The LAUs include one or more transmitters (e.g., a WiFi and/or Bluetooth transmitter) configured to transmit local wireless communications signals that include identification information (e.g., basic service set identifier (BSSID) or media access control (MAC) address) of the LAU. The identification information of the LAU may have been associated with a known location of the LAU previously, such as during installation and/or commissioning of the WCS. In this regard, the LAU can transmit the local wireless communications signals that includes its identification information to a wireless client device. This identification information can be used to associate the known location of the LAU to a location of the wireless client device, because the wireless client device is known to be in the communication range of the LAU. In one example, the carrier of a communication session with a wireless client device in a WCS can instruct the wireless client device to scan for the local wireless communications signals transmitted by an LAU. The wireless client device returns the received identification information from any received wireless communications signals transmitted by an LAU to the carrier through the WCS. The carrier can then use the received identification information from the wireless client device to determine the known location of the LAU, and then associate this known location to the wireless client device to determine the location of the wireless client device. For example, the carrier may have access to a database that has known locations associated with the identification information of the LAUs.

In other aspects, the LAUs may also include a pressure sensor that is configured to determine barometric pressure information of the environment of the LAU. The barometric pressure information of a LAU that is associated with a remote unit that is communicating with a wireless client device can also be provided. This barometric pressure information can then be communicated from the LAU through the WCS to a carrier to provide further altitude information associated with the identification information. The altitude information can be used alone or in conjunction with the location information of the LAU, which is determinable based on the received identification information of the LAU communicating, to determine a location of the wireless client device that includes altitude information. In this regard, if a carrier is equipped or desires to use barometric pressure information to further determine location of a wireless client device in a WCS, the carrier can also instruct the wireless client device to scan for the local wireless communications signals that include barometric pressure information. The carrier can then use the received identification information to determine the known location of the LAU, and the received barometric pressure information received from the wireless client device to determine the altitude of the wireless client device at the known location of the LAU.

As another example, each LAU provided in the WCS may be associated with a remote unit in the WCS so that a wireless client device communicating with a remote unit is also in communication range of an LAU. The LAU may be configured to have substantially the same coverage area as its associated remote unit. As another example, the LAUs may also be configured to receive power from an associated remote unit for convenience in providing a power source for the LAU.

One embodiment of the disclosure relates to a WCS. The WCS comprises a central unit configured to receive downlink communications signals from at least one signal source. The central unit is also configured to distribute the received downlink communications signals over at least one downlink communications medium to at least one remote unit among a plurality of remote units. The central unit is also configured to receive uplink communications signals from the plurality of remote units over at least one uplink communications medium. The central unit is also configured to distribute the received uplink communications signals to the at least one signal source. Each remote unit among the plurality of remote units comprises at least one antenna. Each remote unit among the plurality of remote units is also configured to receive downlink communications signals over the at least one downlink communications medium from the central unit. Each remote unit among the plurality of remote units is also configured to transmit the received downlink communications signals over the at least one antenna to a wireless client device. Each remote unit among the plurality of remote units is also configured to receive uplink communications signals over the at least one antenna from a wireless client device. Each remote unit among the plurality of remote units is also configured to distribute the received uplink communications signals over the at least one uplink communications medium to the central unit. The WCS also comprises one or more LAUs each associated with a remote unit among the plurality of remote units. Each LAU of the one or more LAUs comprises at least one antenna. Each LAU of the one or more LAUs also comprises one or more wireless transmitters coupled to the at least one antenna, each of the one or more wireless transmitters configured to transmit a wireless communications signal comprising identification information associated with a location of the LAU to the wireless client device communicating with the remote unit associated with the LAU.

Another embodiment of the disclosure relates to a method of determining a location of a wireless client device in a WCS. The method comprises receiving in a remote unit among a plurality of remote units, a communication establishment request to a carrier in a first uplink communications signal from a wireless client device. The method also comprises distributing the first uplink communications signal from the remote unit over at least one uplink communications medium to a central unit to be distributed to the carrier. The method also comprises receiving a first downlink communications signal in the remote unit from the central unit over at least one downlink communications medium comprising a scanning instruction to enable the wireless client device to scan a local wireless communications signal transmitted from a local access unit (LAU), the local wireless communications signal comprising identification information of the LAU. The method also comprises receiving a second uplink communications signal from the wireless client device comprising the identification information of the LAU, from the received local wireless communications signal from the LAU. The method also comprises distributing the second uplink communications signal from the remote unit over the at least one uplink communications medium to the central unit to be distributed to the carrier. The carrier may use the received identification information in the received second uplink communications signal to determine location information of the LAU that transmitted the local wireless communications signal to the wireless client device, to determine the location of the wireless client device.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Figure 1:
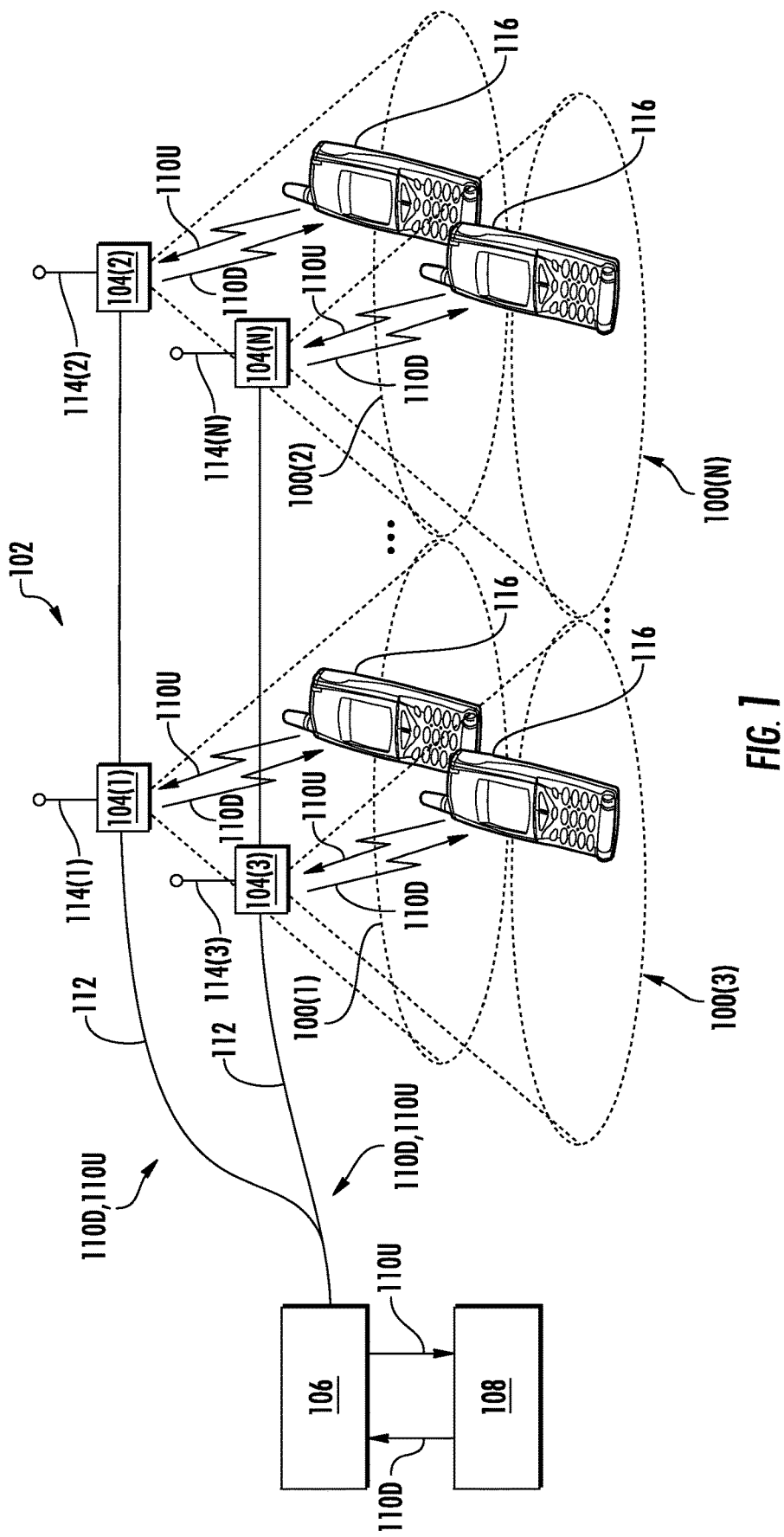
FIG. 1 is a schematic diagram of an exemplary wireless communications system (WCS) in the form of a distributed antenna system (DAS) configured to distribute wireless communications signals to the remote units and to wireless client devices communicating with the remote units.

Embodiments disclosed herein include location access units (LAUs) in a wireless communications system (WCS) for transmitting information to a wireless client device in the WCS for determining location of the wireless client device in the WCS. Related systems and methods are also disclosed. For example, a WCS may be an indoor wireless communications system that includes remote units for distributing communications services to indoor remote coverage areas. It may be desired or necessary to determine the location of wireless client devices communicating within the WCS, such as for emergency 911 (E911) services for example. In this regard, in certain aspects disclosed herein, LAUs are deployed in the WCS. The LAUs include one or more transmitters (e.g., a WiFi and/or Bluetooth transmitter)

configured to transmit local wireless communications signals that include identification information (e.g., basic service set identifier (BSSID) or media access control (MAC) address) of the LAU. The identification information of the LAU may have been associated with a known location of the LAU previously, such as during installation and/or commissioning of the WCS. In this regard, the LAU can transmit the local wireless communications signals that includes its identification information to a wireless client device. This identification information can be used to associate the known location of the LAU to a location of the wireless client device, because the wireless client device is known to be in the communication range of the LAU. In one example, the carrier of a communication session with a wireless client device in a WCS can instruct the wireless client device to scan for the local wireless communications signals transmitted by an LAU. The wireless client device returns the received identification information from any received wireless communications signals transmitted by an LAU to the carrier through the WCS. The carrier can then use the received identification information from the wireless client device to determine the known location of the LAU, and then associate this known location to the wireless client device to determine the location of the wireless client device. For example, the carrier may have access to a database that has known locations associated with the identification information of the LAUs.

In other aspects, the LAUs may also include a pressure sensor that is configured to determine barometric pressure information of the environment of the LAU. The barometric pressure information of a LAU that is associated with a remote unit that is communicating with a wireless client device can also be provided. This barometric pressure information can then be communicated from the LAU through the WCS to a carrier to provide further altitude information associated with the identification information. The altitude information can be used alone or in conjunction with the location information of the LAU, determinable based on the received identification information of the LAU communicating, to determine a location of the wireless client device that includes altitude information. In this regard, if a carrier is equipped or desires to use barometric pressure information to further determine location of a wireless client device in a WCS, the carrier can also instruct the wireless client device to scan for the local wireless communications signals that include barometric pressure information. The carrier can then use the received identification information to determine the known location of the LAU, and the received barometric pressure information received from the wireless client device to determine the altitude of the wireless client device at the known location of the LAU.

As another example, each LAU provided in the WCS may be associated with a remote unit in the WCS so that a wireless client device communicating with a remote unit is also in communication range of an LAU. The LAU may be configured to have substantially the same coverage area as its associated remote unit. As another example, the LAUs may also be configured to receive power from an associated remote unit for convenience in providing a power source for the LAU.

Figure 2:
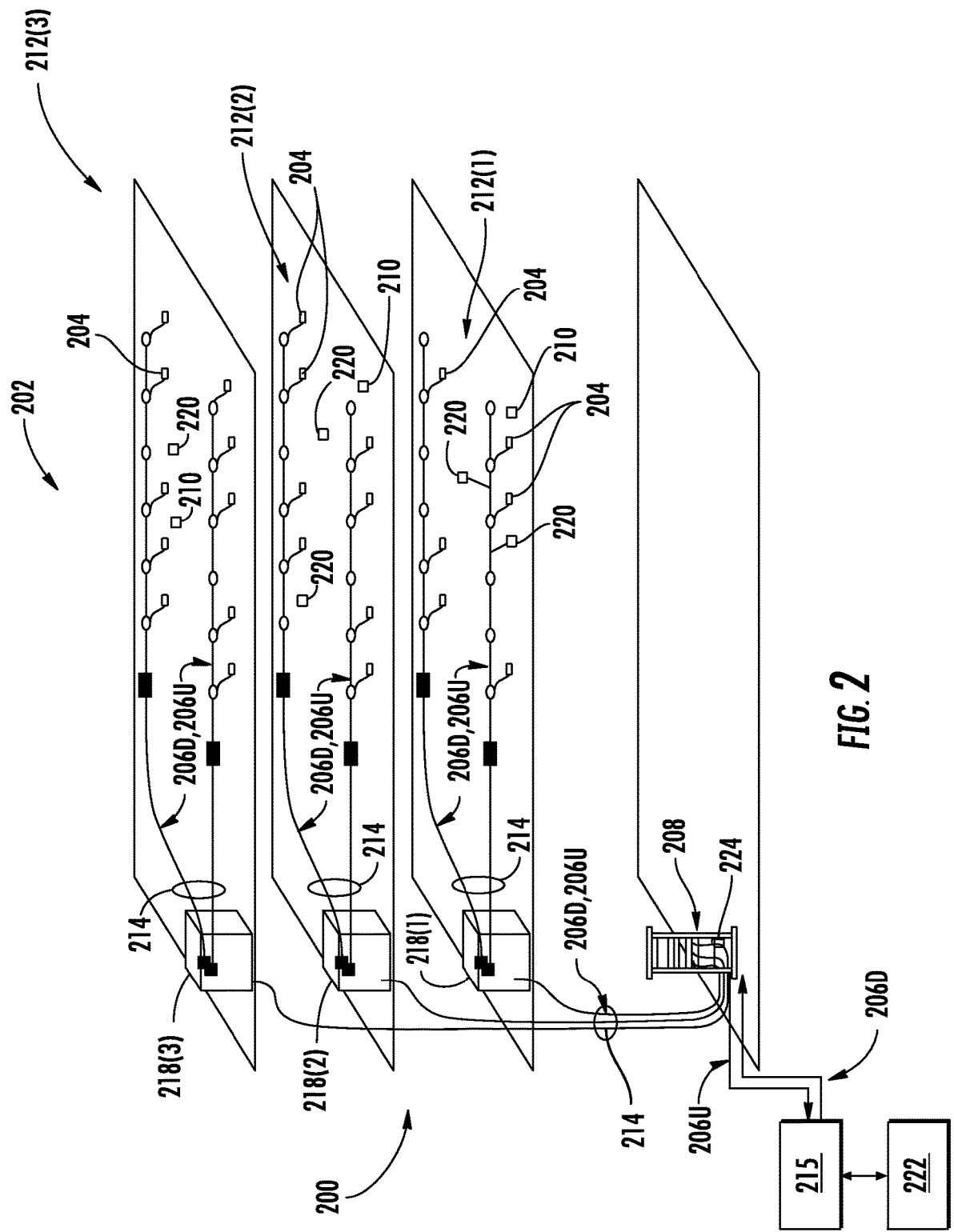
FIG. 2 is a partially schematic cut-away diagram of an exemplary building infrastructure in which an exemplary WCS with a plurality of remote units for receiving and distributing wireless communications signals is deployed, wherein the WCS also includes exemplary location access units (LAUs) each configured to transmit a local wireless communications signal containing identification information to a wireless client device in the WCS, to be used to determine the location of a wireless client device communicating with the LAU.

FIG. 2 is a partially schematic cut-away diagram of an exemplary building infrastructure 200 in which an exemplary WCS 202 with a plurality of remote units 204 for receiving and distributing downlink and uplink communications signals 206D, 206U is deployed. For example, the remote units 204 may be installed in ceilings of the building infrastructure 200. The WCS 202 may be a distributed antenna system (DAS) as an example. A DAS is a network of spatially separated antenna nodes connected to a common source via a transport medium that provides wireless service within a geographic area or structure. In this regard, the remote units 204 may be remote antenna units that each include at least one antenna and are configured to wirelessly transmit the downlink communications signals 206D received from a central unit 208 to wireless client devices 210. For example, the wireless client devices 210 can include devices such as cellular phones, WiFi communications devices, and Bluetooth communication devices. The downlink communications signals 206D can include signals for communications services, such as Cellular, Personal Communication Services (PCS) band, Advanced Wireless Services (AWS), Global System for Mobile communications (GSM) 900, and Universal Mobile Telecommunication System (UMTS), as non-limiting examples. As shown in FIG. 2, the remote units 204 can be distributed on different floors 212(1)-212(3) of the building infrastructure 200 to service wireless client devices 210 located on the different floors 212(1)-212(3). In this example, the building infrastructure 200 has three (3) floors 212(1)-212(3) as a non-limiting example.

With continuing reference to FIG. 2, the central unit 208 is typically located within the building infrastructure 200 and may be located on the lowest floor 212(1) or a basement level for example. The central unit 208 is communicatively coupled to a signal source 215, which may be a base station (also known as base transceiver station) or a baseband unit (BBU) as examples. The central unit 208 receives the downlink communications signals 206D from the signal source 215. The central unit 208 distributes the downlink communications signals 206D over a communications medium 214 to the remote units 204 to be transmitted through respective antennas to the wireless client devices 210 in communication range of a remote unit 204. The remote units 204 are also configured to receive uplink communications signals 206U from the wireless client devices 210 to be distributed to the central unit 208 and to the signal source 215. The remote units 204 distribute the received uplink communications signals 206U over the communications medium 214 to the central unit 208, which can then distribute the uplink communications signals 206U to the signal source 215. The communication medium 214 can be an electrical conductor medium or optical fiber medium, as non-limiting examples. Further, the communication medium 214 can include separate medium for uplink and downlink paths between the remote units 204 and the central unit 208. The WCS 202 may also include power units 218(1)-218(3) on each floor 212(1)-212(3) to facilitate distributing power to the remote units 204 for operation. Alternatively, local power sources may be provided at the location of the remote units 204.

While extending the remote units 204 to locations in the building infrastructure 200 can provide seamless wireless communications coverage to the wireless client devices 210 located therein, other services may be negatively affected or not possible due to the indoor environment. For example, it may be desired or required to provide localization services for the wireless client devices 210, such as emergency 911 (E911) services as an example. If the wireless client devices 210 are located indoors, techniques such as global positioning services (GPS) may not be effective at providing or determining the location of the wireless client devices 210. Further, triangulation and/or trilateration techniques from the outside network may not be able to determine the location of the wireless client devices 210. Per the Federal Communications Commission (FCC) in the United States, over 10,000 lives are saved per year by being able to obtain accurate location information of mobile devices. Carriers may need to have the ability to provide accurate location information of mobile devices in their network at least 80% of the time with 90% accuracy.

In this regard, the WCS 202 in FIG. 2 also includes location access units (LAUs) 220 for transmitting information to the wireless client devices 210 for determining location of the wireless client device 210 in the WCS 202. As will be discussed in more detail below, the LAUs 220 include one or more transmitters (e.g., a WiFi and/or Bluetooth transmitter) configured to transmit local wireless communications signals that include identification information (e.g., basic service set identifier (BSSID) or media access control (MAC) address) of the LAU 220. The identification information of the LAU 220 may have been associated with a known location of the LAU 220 previously, such as during installation and/or commissioning of the WCS 202. In this regard, the LAU 220 can transmit the local wireless communications signals that includes its identification information to the wireless client device 210 in communication range of the LAU 220. This identification information can be used to associate the known location of the LAU 220 to a location of the wireless client device 210, because the wireless client device 210 is known to be in the communication range of the LAU 220. In one example, the carrier of a communication session with a wireless client device 210 in the WCS 202 can instruct the wireless client device 210 to scan for the local wireless communications signals transmitted by an LAU 220. The wireless client device 210 returns the received identification information from any received wireless communications signals transmitted by an LAU 220 in an uplink communications signal 206U to the signal source 215, which may be a carrier. The signal source 215 can then use the received identification information from the wireless client device 210 to determine the known location of the LAU 220, and then associate this known location to the wireless client device 210 to determine the location of the wireless client device 210. For example, the signal source 215 may have access to a location database 222 that has known locations associated with the identification information of the LAUs 220. For example, the location database 222 may be a NEAD database.

As shown in FIG. 2, the LAU 220 can be coupled to the communications medium 214 to be able to communicate with the central unit 208. Alternatively, the LAU 220 may be a standalone unit that is not communicatively coupled to the central unit 208. One advantage of coupling the LAU 220 to the communication medium 214 is to allow the central unit 208 to exchange management communications signals with the LAU 220. For example, this may be useful in allowing a technician to conveniently configure operational or configuration settings for the LAU 220 at installation or commissioning. A user may be able to interact with a software interface 224, such as a graphical user interface (GUI), hosted by the central unit 208 or accessible through interaction with the central unit 208, to configure a map that includes location information of the LAU 220, which can be provided to the signal source 215 to maintain such location information in the location database 222 for example.

Figure 3:
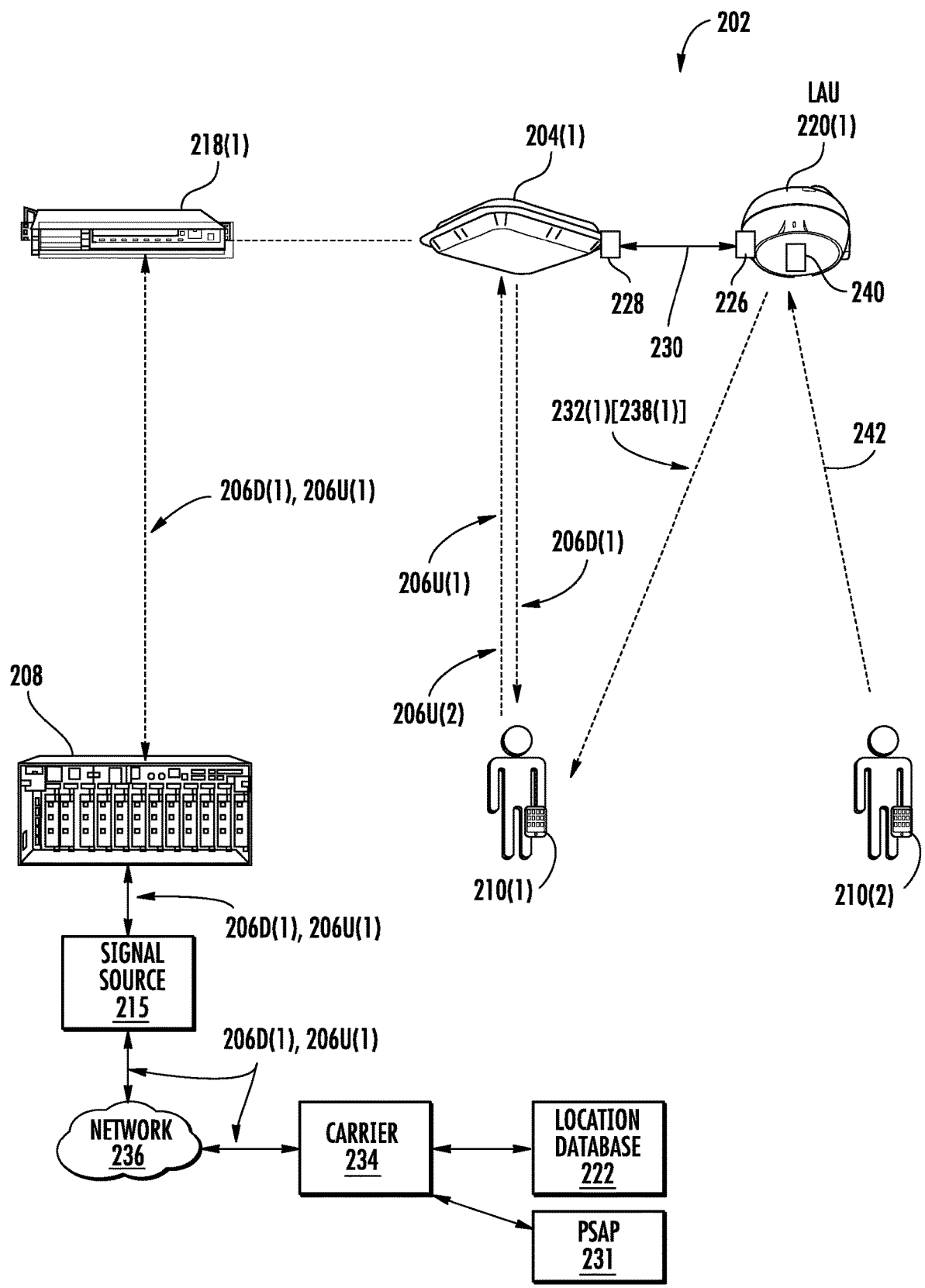
FIG. 3 is another schematic diagram of the WCS in FIG. 2 illustrating a remote unit and a LAU associated with the remote unit, wherein the LAU is transmitting a local wireless communications signal containing identification information to a wireless client device in the WCS, wherein the identification can be provided by the wireless client device to its carrier to associate such identification information as location of a wireless client device.

FIG. 3 is another schematic diagram of the WCS 202 in FIG. 2 illustrating one remote unit 204(1) and a LAU 220(1) associated with the remote unit 204(1). As will be described in more detail below, the LAU 220(1) is an electronic device that is provided in a package or housing to be able to be mounted. In this example, the LAU 220(1) includes an input power port 226 that is configured to be coupled to a power source to provide power for operation of the LAU 220(1). In this example, the input power port 226 of the LAU 220(1) is coupled to an output power port 228 of the remote unit 204(1) through an electrically conducting cable 230, such as an Ethernet cable for example. In this manner, a separate power source is not required to provide power to the LAU 220(1). As previously discussed, the remote unit 204(1) may receive power from a power unit 218(1), as shown in FIG. 3, which also provides power to other remote units 204 in the WCS 202. The output power port 228 may be a Power-over-Ethernet (PoE) port such that an Ethernet cable used as the electrically conducting cable 230 can provide power to the LAU 220(1) through its input power port 226, which would also be an Ethernet port in this example. Powering the LAU 220(1) from the remote unit 204(1) may not unduly restrict the location of the LAU 220(1) in the WCS 202, because it may be desired to provide for the communication range of the LAU 220(1) to be substantially the same as the remote unit 204(1) to achieve the desired location granularity. Also, in examples discussed below, the use of the LAU 220(1) to determine the location of the wireless client device 210(1) also being in communication range with a remote unit 204(1) to be able to provide the location information of the LAU 220(1) received in local wireless communications signals 232(1) to the central unit 208 via the remote unit 204(1).

With continuing reference to FIG. 3, the wireless client device 210(1) is configured to send an uplink communications signal 206U(1) to request establishing a communication session with its carrier 234. Because the wireless client device 210(1) is in the WCS 202 in communication range of the remote unit 204(1), the uplink communications signal 206U(1) is received by the remote unit 204(1). The request to establish a communication session in the uplink communications signal 206U(1) can be a location-based communication session request, such as a E911 call, that requires the carrier 234 to establish the location of the wireless client device 210(1). The uplink communications signal 206U(1) with the location-based communication session request is communicated to the central unit 208, and to the carrier 234 through the signal source 215 and a network 236 (e.g., the Internet). Identification information of the wireless client device 210(1) is provided in the uplink communications signal 206U(1). In response to the carrier 234 determining that the received uplink communications signal 206U(1) is a location-based communication session request from the wireless client device 210(1), the carrier 234 may forward the location-based communication session request to a public-safety answering point (PSAP) 231, sometimes called "public-safety access point", which is a call center responsible for answering calls to an emergency telephone number for police, firefighting, and ambulance services. Trained telephone operators are also usually responsible for dispatching these emergency services. The carrier 234 can also send a downlink communications signal 206D(1) that will be distributed to the remote unit 204(1) by the central unit 208. The downlink communications signal 206D(1) can instruct the wireless client device 210(1) to scan for local wireless communications signals 232(1) from a LAU 220(1) to be used to determine location of the wireless client device 210(1). If the location of the LAU 220(1) is known, and the wireless client device 210(1) can receive local wireless communications signals 232(1) from a LAU 220(1), the wireless client device 210(1) is known to be located relative to the LAU 220(1) and in an area within the communication range of the LAU 220(1). Thus, if for example, the LAU 220(1) includes a short range transmitter, such as a WiFi transmitter and/or a Bluetooth transmitter, the local wireless communications signals 232(1) transmitted by the LAU 220 are known to be in a certain limited range of the physical location of the LAU 220. Use of a WiFi transmitter and/or a Bluetooth transmitter in the LAU 220 may be advantageous, because wireless client device 210(1) may already include WiFi transmitter and/or Bluetooth receivers.

With continuing reference to FIG. 3, in this example, in response to the wireless client device 210(1) receiving the downlink communications signal 206D(1) instructing the wireless client device 210(1) to scan for local wireless communications signals 232(1) from a LAU 220, the wireless client device 210(1) receives the local wireless communications signals 232(1) from the LAU 220(1) in proximity to the location of the remote unit 204(1). The local wireless communication signals 232(1) include identification information 238(1) that can be used to determine the location of the LAU 220(1). For example, if the local wireless communications signals 232(1) are WiFi communications signals, the local wireless communications signals 232(1) may include identification information 238(1) in the form of a basic service set identifier (BSSID) of the WiFi transmitter in the LAU 220(1). As another example, if the local wireless communications signals 232(1) are Bluetooth communications signals, the local wireless communications signals 232(1) may include identification information 238(1) in the form of universal unique identification (UUID) and/or a Bluetooth media access control (MAC) address. The wireless client device 210(1) transmits a second uplink communications signal 206U(2) that includes the received identification information 238(1) of the LAU 220(1) that is received by the remote unit 204(1) and provided to the carrier 234 via the central unit 208, signal source 215, and network 236. The carrier 234 can then use the received identification information 238(1) in the received second uplink communications signal 206U(2) to determine the location of the wireless client device 210(1). For example, the carrier 234 may have access to the location database 222 that includes a registration of LAUs 220, including LAU 220(1), and their physical locations. The location database 222 may be co-located with the carrier 234 or provided at a remote location from the carrier 234, such as in a NEAD database. The physical location may be X-Y coordinate information, such as latitude and longitude for example. During the commissioning of the LAUs 220 in the WCS 202, a technician or other user may have determined the physical location of the LAUs 220 and provided such to the carrier 234 to register in the location database 222. The carrier 234 can perform a look-up of location information in the location database 222 based on the identification information 238(1) to determine the location of the LAU 220(1), and thus the relative location of the wireless client device 210(1). For example, the LAU 220(1) may include a software interface 240, such as a graphical user interface (GUI), that can be accessed remotely through another device, such as another wireless client device 210(2) via signal 242 to communicate with the LAU 220(1) for such tasks such as configuration and configuring identification information, etc.

Figure 4:
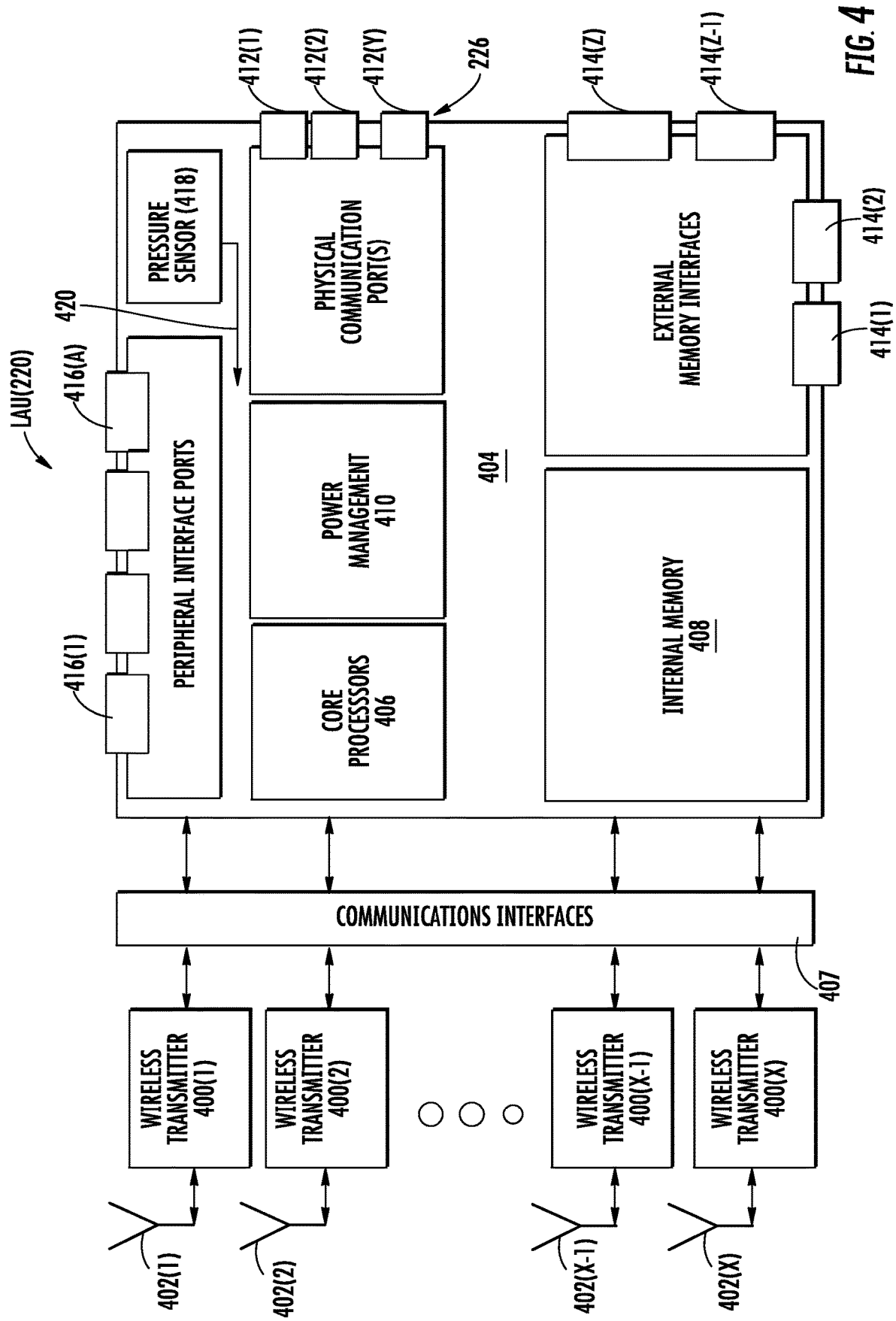
FIG. 4 is a circuit diagram of exemplary components that can be included in the LAU in FIG. 3.

FIG. 4 is a circuit diagram of exemplary internal components that can be included in the LAU 220 in FIGS. 2 and 3. As illustrated in FIG. 4, the LAU 220 can includes a series of wireless transmitters 400(1)-400(X) that are configured to transmit local wireless communications signals 232 over respective antennas 402(1)-402(X). As discussed above, the wireless transmitters 400(1)-400(X) can include a WiFi transmitter and/or Bluetooth transmitter that are configured to transmit the local wireless communications signals 232 over short ranges. The LAU 220 may also include a processor-based system 404 that may include multiple processors or a multi-core processor 406, as examples, (hereinafter "processor 406") where application layer applications reside and are executed. The application layer applications can allow handling of functions of the LAU 220, such as configuration, setting the identification information, and control of transmitting the local wireless communication signals 232 by communication through the communications interfaces 407. The application layer applications can be stored in internal memory 408. The application level applications can also be stored by the processor 406 in the internal memory 408. The processor-based system 404 includes a power management module 410 to manage power consumption in the processor-based system 404, such as to achieve the desired performance levels. The LAU 220 can also include one or more physical communications ports 412(1)-412(Y) to allow wired communications to be provided to and from the LAU 220, if desired. For example, a technician may connect a wired communication device to one of the physical communications ports 412(1)-412(Y) to retrieve application level information or load or update application layer applications. One of the physical communications ports 412(1)-412(Y) may be the input power port 226 described above with regard to FIG. 3. The LAU 220 may also include one or more external memory interfaces 414(1)-414(Z), such as memory card ports, USB ports, etc. for storing data from internal memory 408, including application level information. The LAU 220 may also include one or more peripheral interface ports 416(1)-416(A) for connecting other peripheral devices.

With continuing reference to FIG. 4, the LAU 220 may also include a pressure sensor 418. The pressure sensor 418 is configured to generate a pressure signal 420 indicative of the barometric pressure of the environment of the LAU 220. As will be discussed in more detail below in other examples, the LAU 220 may be configured to provide the pressure information to the remote unit 204(N), which can be provided to the central unit 208 and/or the carrier 234. The pressure information can be requested by the carrier 234 to the LAU 220 that is associated with the remote unit 204(N) communicating with the wireless client device 210(N) in response to a request for a location-based communications session in an uplink communications signal 206U received from the wireless client device 210(N). Pressure information about the location of the LAU 220 can provide altitude or Z coordinate location of a wireless client device 210, which may be advantageous if other identification information 238 of the LAU 220 is not available, and/or the carrier 234 has not been configured to support receiving the identification information 238 to correlate such to a location of the LAU 220, and thus a wireless client device 210 by association.

Figure 5:
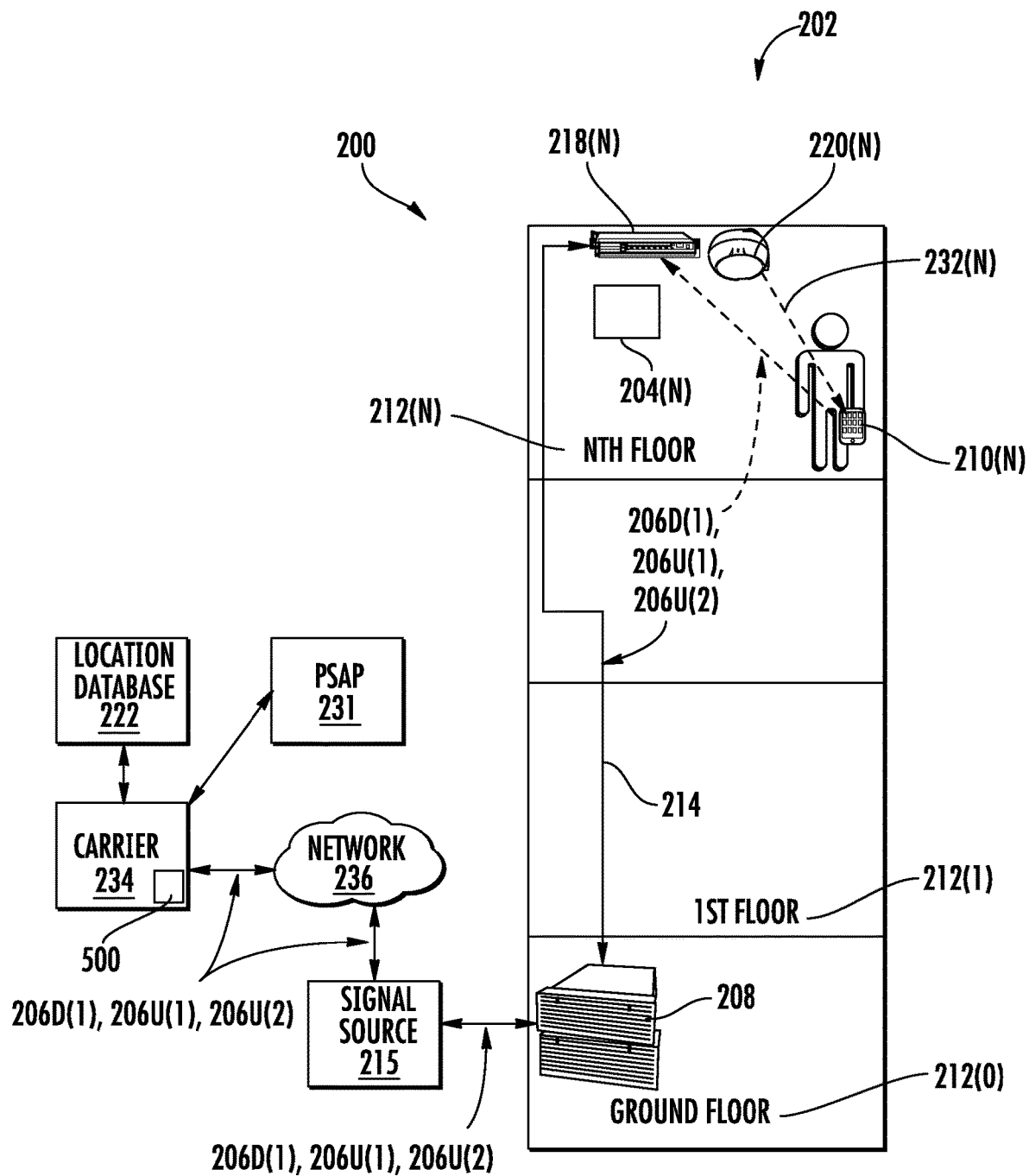
FIG. 5 is a schematic diagram of a wireless client device establishing a communication session with a carrier through communication with a remote unit in an upper floor of a building communicating with a remote unit of a WCS, and determining location of the wireless client device based on identification information received in a local wireless communications signal received by a wireless client device from a LAU in the WCS.
Figure 6:
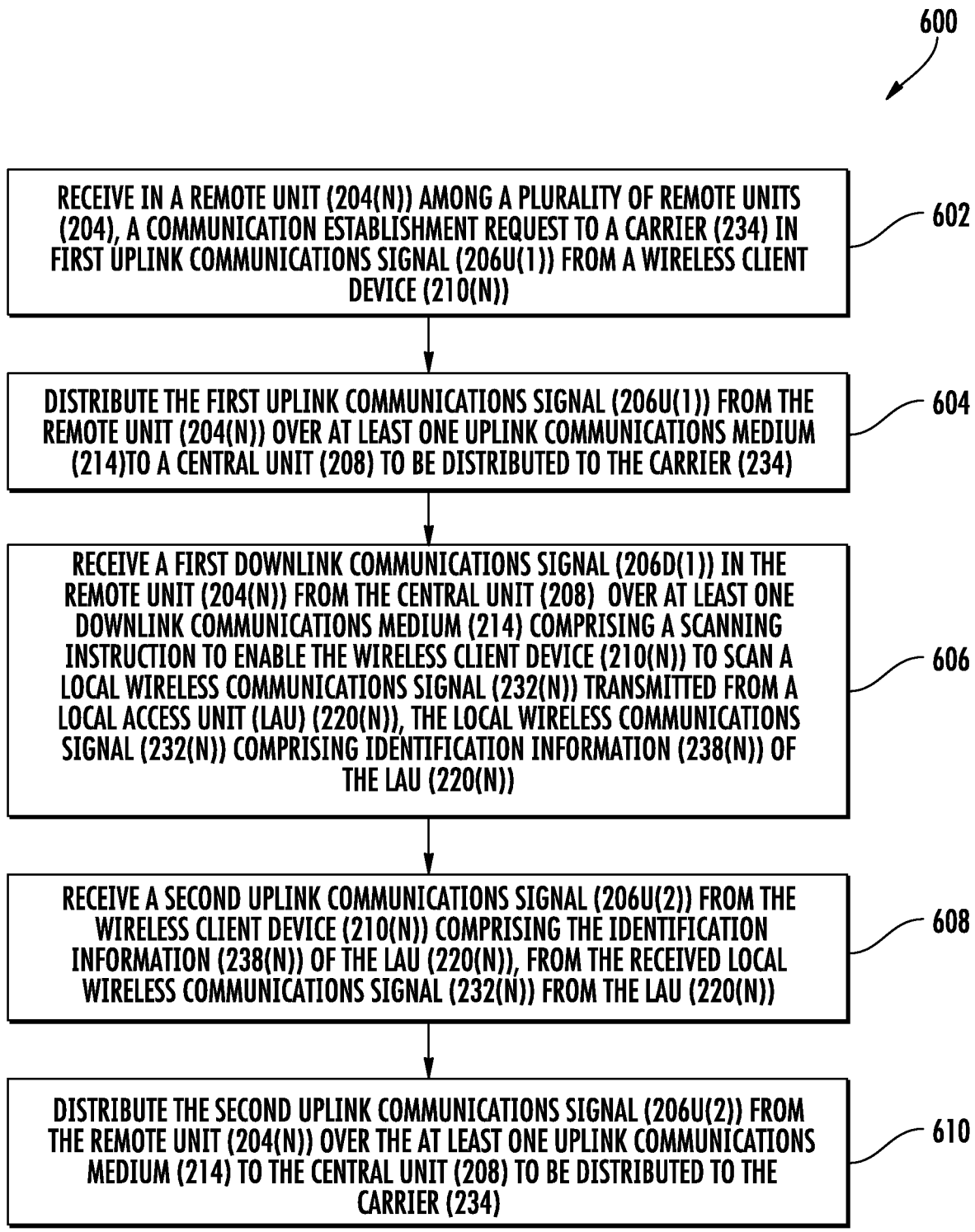
FIG. 6 is a flowchart illustrating an exemplary process of the wireless client device in FIG. 5 establishing a communication session with a carrier through communication with a remote unit in an upper floor of a building communicating with a remote unit of a WDS, and determining location of the wireless client device based on identification information received in local wireless communication signal received by a wireless client device from a LAU in the WCS.

To further illustrate an example of using the LAU 220 to determine a location of a wireless client device 210 in the WCS 202, FIGS. 5 and 6 are provided. FIG. 5 is a schematic diagram of a wireless client device 210(N) on the Nth floor 212(N) of the building infrastructure 200 establishing a communication session with the carrier 234 through communication with a remote unit 204(N) of the WCS 202, and determining location of the wireless client device 210(N) based on identification information 238(N) received in a local wireless communication signal 232(N) received by a wireless client device 210(N) that was transmitted by the LAU 220(N). FIG. 6 is a flowchart illustrating an exemplary process 600 of the wireless client device 210(N) in FIG. 5 establishing a communication session with the carrier 234 through communication with a remote unit 204(N) of the WCS 202, and determining location of the wireless client device 210(N) based on identification information 238(N) received in a local wireless communication signal 232(N) received by a wireless client device 210(N) that was transmitted by the LAU 220(N). FIGS. 5 and 6 will be discussed in conjunction.

As shown in FIG. 5, the remote unit 204(N) receives a communication establishment request to the carrier 234 in first uplink communications signal 206U(1) from a wireless client device 210(N) (block 602 in FIG. 6). Note that this example relates to a wireless client device 210(N) on the Nth floor 212(N) of the building infrastructure 200, but such is not limiting. The communication establishment request may be a location-based communication establishment request, such as an E911 call. In response, the remote unit 204(N) distributes the first uplink communications signal 206U(1) over the uplink communications medium 214 to the central unit 208 to be distributed to the carrier 234 (block 604 in FIG. 6). In response, the carrier 234 sends a downlink communications signal 206D(1) that will be received by the central unit 208 and distributed to the remote unit 204(N) (block 606 in FIG. 6). The downlink communications signal 206D(1) can instruct the wireless client device 210(N) to scan for local wireless communications signals 232(N) from a LAU 220(N) to be used to determine location of the wireless client device 210(N). In this regard, the first downlink communications signal 232(N) comprises a scanning instruction to enable the wireless client device 210(N) to scan a local wireless communications signal 232(N) transmitted from a LAU 220(N), wherein the local wireless communications signal 232(N) comprises identification information 238(N) of the LAU 220(N) (block 606 in FIG. 6). In response, the remote unit 204(N) receives a second uplink communications signal 206U(2) from the wireless client device 210(N) comprising the identification information 238(N) of the LAU 220(N), from the received local wireless communications signal 232(N) transmitted by the LAU 220(N) (block 608 in FIG. 6). The remote unit 204(N) distributes the second uplink communications signal 206U(2) over the at least one uplink communications medium 214 to the central unit 208 to be distributed to the carrier 234 (block 610 in FIG. 6). As previously discussed, the carrier 234 can use the received identification information 238(N) to determine location information of the LAU 220(N) that transmitted the local wireless communications signal 232(N) to the wireless client device 210(N). For example, the carrier 234 may look up the location information of the LAU 220(N) in the location database 222 using the identification information 238(N) as a search term or index. The carrier 234 may also store the determined location information of the LAU 220(N) as a location of the wireless client device 210(N), such as in the location database 222 for example, or local memory 500 as another example.

The LAU 220 may be also configured to provide pressure information to the central unit 208, which can also be provided to the carrier 234. The pressure information can be requested by the carrier 234 to the LAU 220 that is associated with the remote unit 204(N) communicating with the wireless client device 210(N) in response to a request for a location-based communications session in an uplink communications signal 206U received from the wireless client device 210(N). Pressure information about the location of the LAU 220 can provide altitude or Z coordinate location of a wireless client device 210, which may be advantageous if other identification information 238 of the LAU 220 is not available, and/or the carrier 234 has not been configured to support receiving the identification information 238 to correlate such to a location of the LAU 220, and thus a wireless client device 210 by association.

Figure 7:
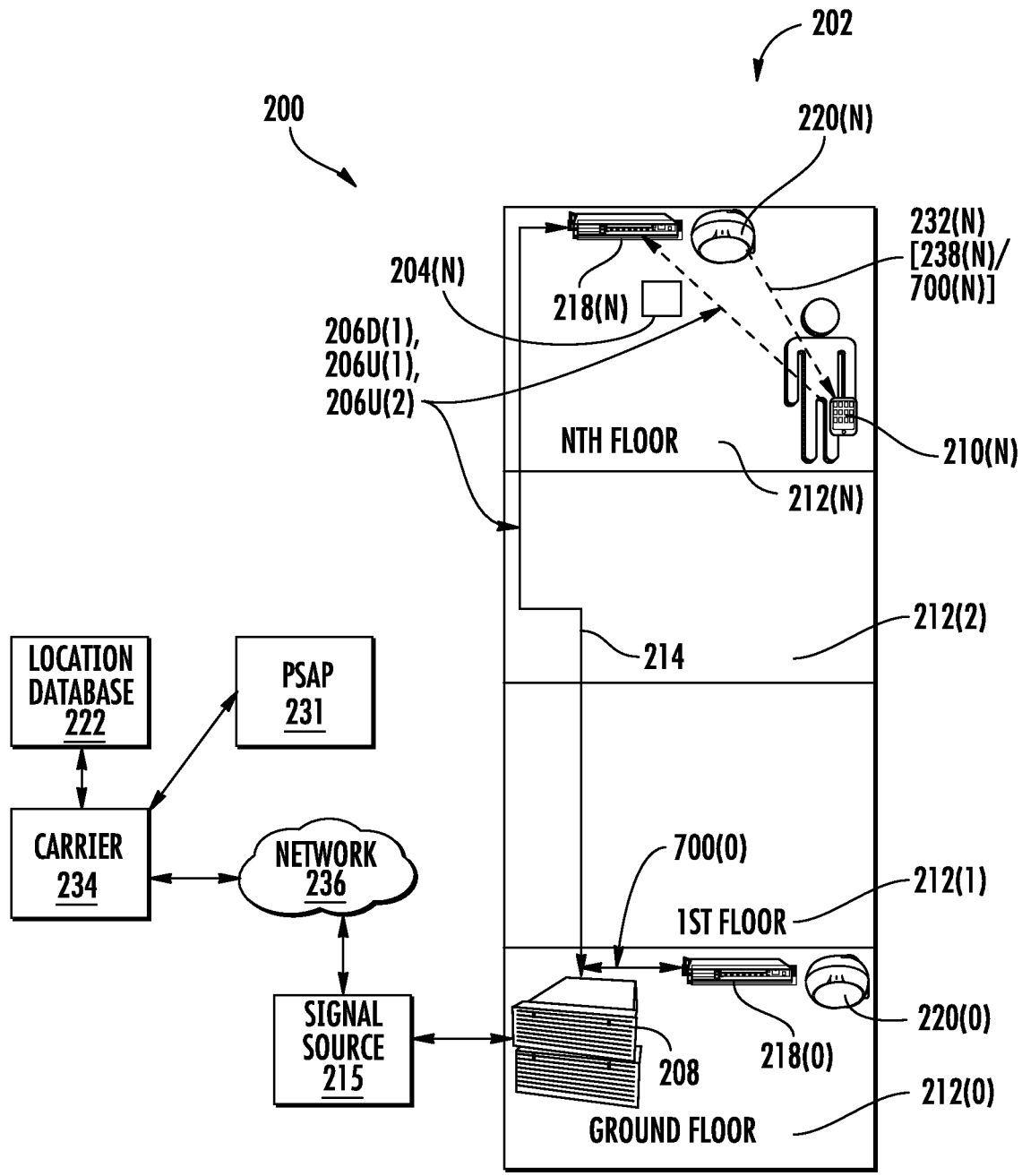
FIG. 7 is a schematic diagram of a wireless client device establishing a communication session with a carrier through communication with a remote unit in an upper floor of a building communicating with a remote unit of a WCS, and determining location of the wireless client device based on barometric pressure information received from a LAU associated with a remote unit communicating with a wireless client device in the WCS.
Figure 8:
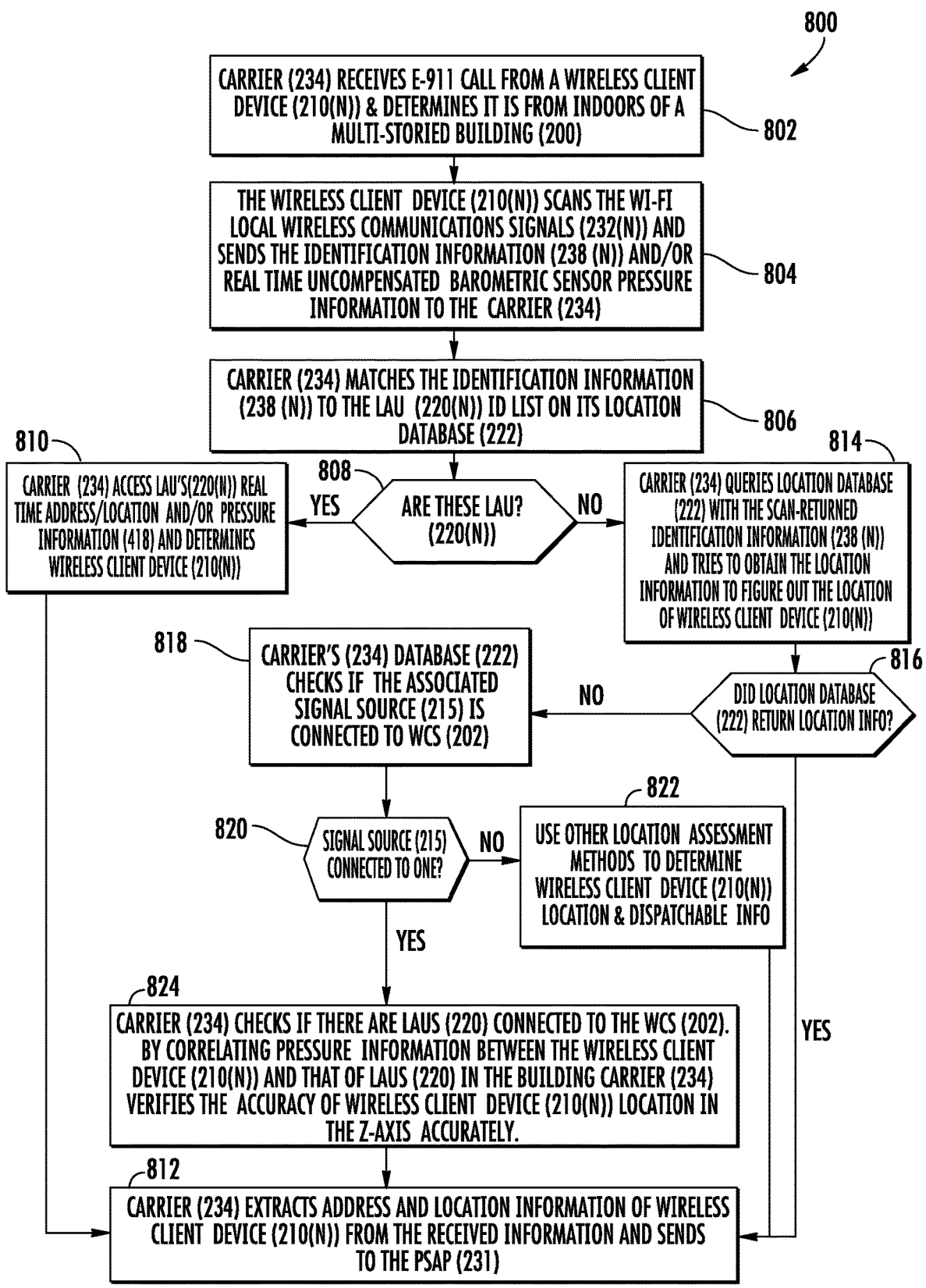
FIG. 8 is a flowchart illustrating an exemplary process of the wireless client device in FIG. 7 establishing a communication session with a carrier through communication with a remote unit in an upper floor of a building communicating with a remote unit of a WCS, and determining location of the wireless client device based on the received barometric pressure information received from a LAU associated with a remote unit communicating with a wireless client device in the WCS.

In this regard, FIG. 7 is a schematic diagram of the wireless client device 210(N) on the Nth floor 212(N) of the building infrastructure 200 establishing a communication session with a carrier 234 through communication with a remote unit 204(N), and determining location of the wireless client device 210(N) that can be based on barometric pressure information received from the LAU 220(N) associated with the remote unit 204(N) communicating with the wireless client device 210(N). FIG. 8 is a flowchart illustrating an exemplary process 800 of the wireless client device 210(N) in FIG. 7 establishing a communication session with the carrier 234 through communication with a remote unit 204(N) of the WCS 202, and determining location of the wireless client device 210(N) that can be based on barometric pressure information provided by the LAU 220(N) for the wireless client device 210(N) from a LAU 220(N) in the WCS 202. FIGS. 7 and 8 will be discussed in conjunction.

As shown in FIG. 7, the remote unit 204(N) receives a communication establishment request and transmits the communication establishment request to the carrier 234 in first uplink communications signal 206U(1) from a wireless client device 210(N) (block 802 in FIG. 8). Note that this example relates to a wireless client device 210(N) on the Nth floor 212(N) of the building infrastructure 200, but such is not limiting. The communication establishment request may be a location-based communication establishment request, such as an E911 call. In response, the remote unit 204(N) distributes the first uplink communications signal 206U(1) over the uplink communications medium 214 to the central unit 208 to be distributed to the carrier 234. In response, the carrier 234 sends a downlink communications signal 206D (1) that will be received by the central unit 208 and distributed to the remote unit 204(N). The downlink communications signal 206D(1) can instruct the wireless client device 210(N) to scan for local wireless communications signals 232(N) from a LAU 220(N) to be used to determine location of the wireless client device 210(N). In this regard, the first downlink communications signal 206D(1) comprises a scanning instruction to cause the wireless client device 210(N) to scan a local wireless communications signal 232(N) transmitted from a LAU 220(N), wherein the local wireless communications signal 232(N) comprises identification information 238(N) of the LAU 220(N) (block 804 in FIG. 8). In response, the remote unit 204(N) receives a second uplink communications signal 206U(2) from the wireless client device 210(N) comprising the identification information 238(N) of the LAU 220(N) from the received local wireless communication signal 232(N) transmitted by the LAU 220(N). The remote unit 204(N) distributes the second uplink communications signal 206U(2) over the at least one uplink communications medium 214 to the central unit 208 to be distributed to the carrier 234. As previously discussed, the carrier 234 can use the received identification information 238(N) to determine location information of the LAU 220(N) that transmitted the local wireless communications signal 232(N) to the wireless client device 210(N). For example, the carrier 234 may look up the location information of the LAU 220(N) in the location database 222 using the identification information 238(N) as a search term or index (block 806 in FIG. 8).

With continuing reference to FIGS. 7 and 8, the carrier 234 determines if the identification information 238(N) for the LAU 220(N) contains the actual location of the LAU 220(N) (block 808 in FIG. 8). If so, the carrier 234 uses the actual location information of the LAU 220(N) for the location of the wireless client device 210(N) (block 810 in FIG. 8). The carrier 234 can also use the pressure information 418 to determine the altitude or Z coordinate of the location of the wireless client device 210(N), and send the location of the wireless client device 210(N) to the PSAP 231 (block 812 in FIG. 8). In this regard, the carrier 234 can provide a second downlink communications signal to request pressure information 700(N) of the LAU 220(N) based on the pressure sensor 418 therein (see FIG. 4). The pressure information 700(N) can be requested by the carrier 234 to the LAU 220(N) associated with the remote unit 204(N) communicating with the wireless client device 210 (N) in response to a request for a location-based communications session in an uplink communications signal 206U(1) received from the wireless client device 210(N). If however, the carrier 234 determines that the identification information 238(N) does not contain the actual location of the LAU 220(N), but rather the identification information 238(N) for the LAU 220(N) (block 808 in FIG. 8), the carrier 234 accesses the location information in the location database 222 corresponding to the identification information 238(N) to determine the location of the LAU 220(N) and thus the wireless client device 210(N) (block 814 in FIG. 8). If the location database 222 contained an entry for the identification information 238(N) of the LAU 220(N) (block 816 in FIG. 8), the carrier 234 uses the location information from the location database 222 corresponding to the identification information 238(N) to send to the PSAP 231 (block 812 in FIG. 8). If however, the database 222 did not contain an entry for the identification information 238(N) of the LAU 220(N), the carrier 234 determines if the signal source 215 for the carrier 234 is connected to the WCS 202 containing the LAU 220(N) (block 818 in FIG. 8).

With continuing reference to FIG. 8, if the signal source 215 is connected to the WCS 202 containing the LAU 220(N) (block 820 in FIG. 8), the carrier 234 will use other location assessment methods to determine the location of the wireless client device 210(N) (block 822 in FIG. 8), and send such location information to the PSAP 231 (block 812 in FIG. 8). If the signal source 215 is connected to the WCS 202 containing the LAU 220(N) (block 818 in FIG. 8), the carrier 234 checks to see if any other LAUs 220 are connected to the WCS 202 (block 824 in FIG. 8). Because the location information based on the identification information 238(N) is not available for the LAU 220(N), in this example, a more accurate determination of the altitude or Z coordinate of the location of the wireless client device 210(N) is determined. Since the WCS 202 that is connected to the LAU 220(N) is known, knowing the altitude or Z coordinate of the location of the wireless client device 210(N) can be used to determine the location of the wireless client device 210(N) relative to the WCS 202 location. In this regard, the carrier 234 may receive pressure information 700(0) from a central LAU 220(0) or other LAUs 220 that have a known altitude or Z coordinate location as well as the LAU 220(N) associated with the remote unit 204(N) communicating with the wireless client device 210(N). In this manner, the carrier 234 can compensate the pressure information 700(N) received from LAU 220(N) with the pressure information 700(0) from a central LAU 220(0) to provide a more accurate altitude or Z coordinate location of the wireless client device 210(N). The barometric pressure can change based on temperature and other environmental factors, so compensating the received relative pressure information 700(N) received from LAU 220(N) with the pressure information 700(0) from a central LAU 220(0) at a known altitude or Z coordinate location, can be important to provide an accurate altitude or Z coordinate location of the wireless client device 210(N). The carrier 234 uses the location information from the location database 222 corresponding to the identification information 238(N) to send to the PSAP 231 (block 812 in FIG. 8).

Figure 10:
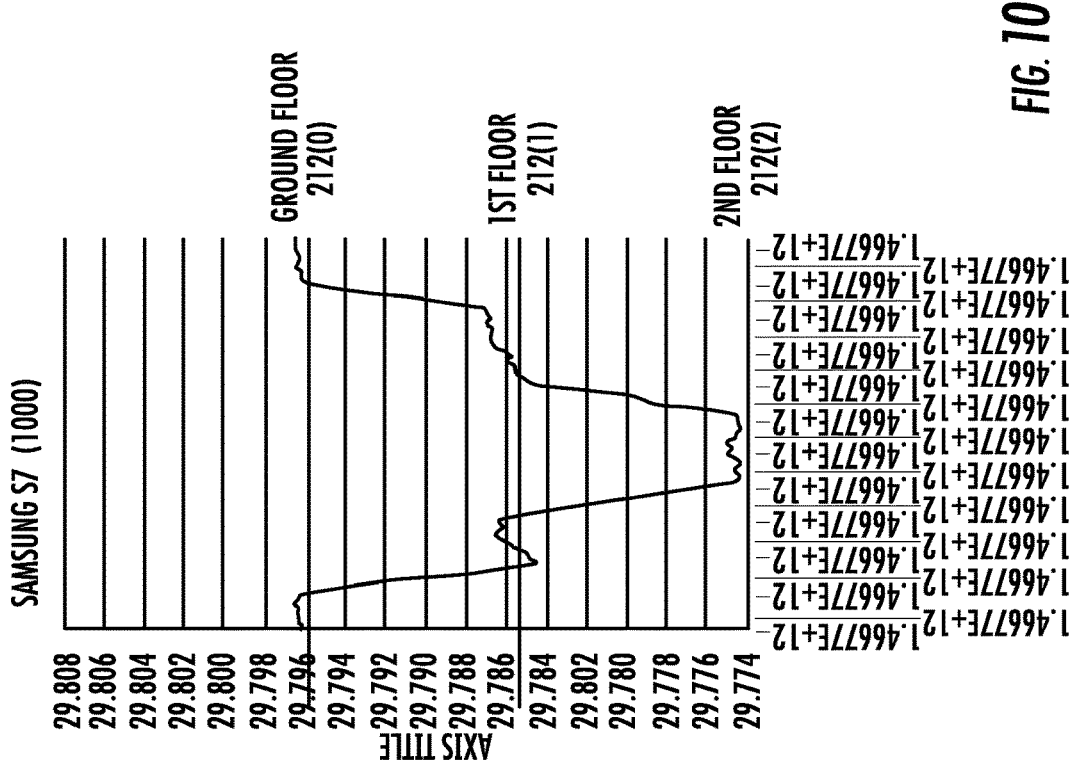
FIGS. 9 and 10 are schematic diagrams illustrating exemplary change in barometric pressure of a wireless client device as a function of floor location of a wireless client device.
Figure 9:
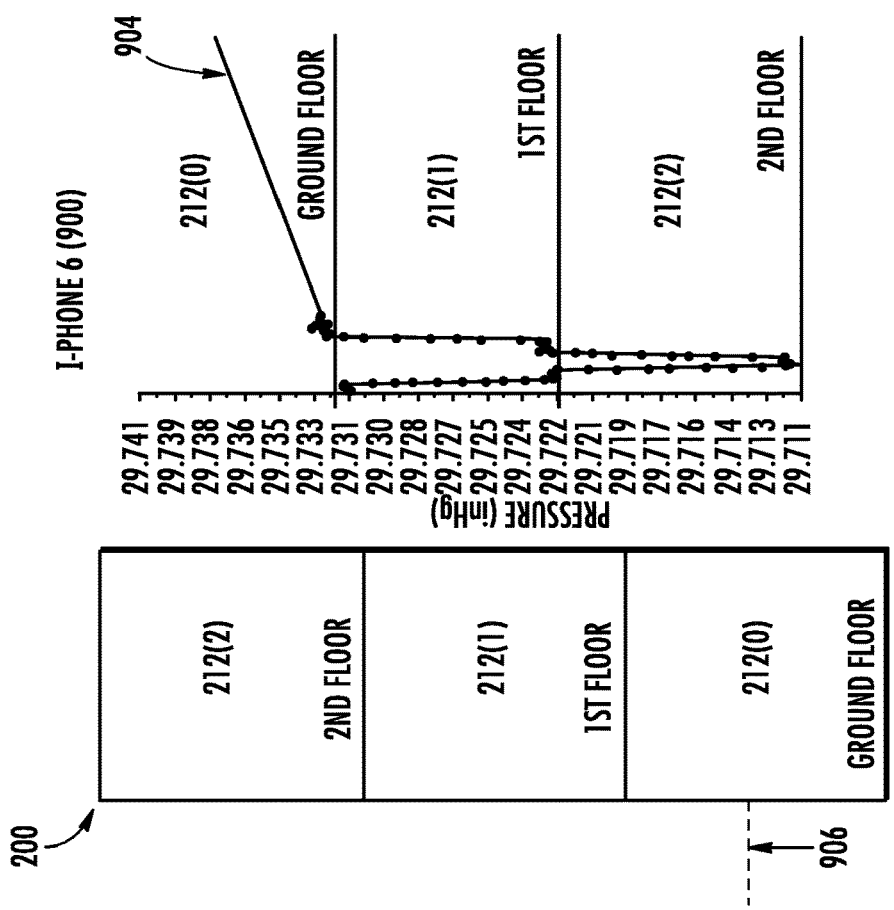
Figure 11:
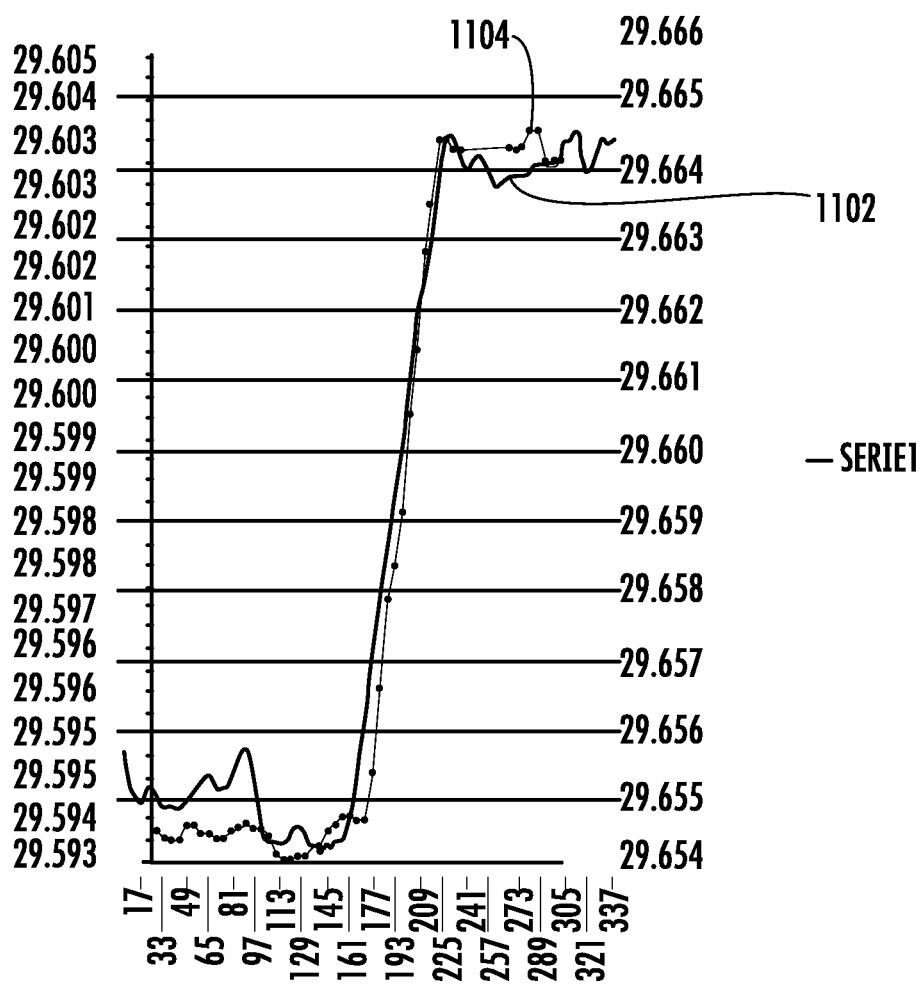
FIG. 11 is a graph illustrating uncompensated and compensated change barometric pressure of a wireless client device as a function of floor location of a wireless client device.

Barometric pressure can also vary based on the device type of the wireless client device 210. For example, FIGS. 9 and 10 are graphs 900, 1000 illustrating exemplary change in barometric pressure of an Apple iPhone® 6 and Samsung S7 mobile devices as a function of floor 212(0)-212(2) in the building infrastructure 200. Barometric pressure can also change over time even if the wireless client device 210 remains stationary as shown in curve 904 in graph 900 in FIG. 9. Barometric pressure can also be relative to the building infrastructure's 200 location relative to sea-level 906. Room-to-room temperature variations in the building infrastructure 200 can also cause barometric pressure to vary even on the same floor 212(0)-212(2) and the same altitude or Z coordinate location. Variation in barometric pressure can also vary between the LAU 220 and a corresponding wireless client device 210 that is close enough to the LAU 220 to receive the local wireless communications signal 232 from the LAU 220. This is shown in the graph 1100 in FIG. 11, which shows the variation between the barometric pressure 1102 of a LAU 220 and barometric pressure 1104 of an Apple iPhone® 6 wireless client device 210. Because of these variances, compensating the pressure information 700 received from a LAU 220 to determine a location of a wireless client device 210, may be important to offset the variations that can occur in measurement of barometric pressure.

Figure 12:
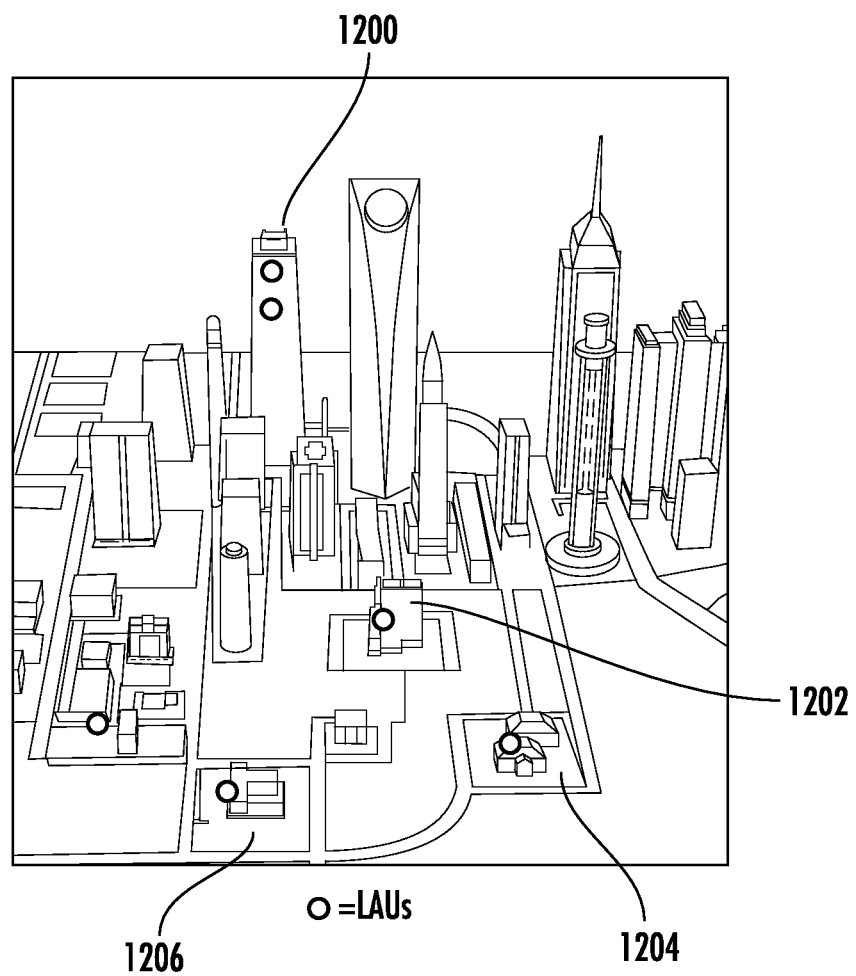
FIG. 12 is a schematic diagram of an exemplary city center with a plurality of buildings each including a WCS that includes LAUs each configured to transmit a local wireless communications signal containing identification information to a wireless client device in the WCS, wherein the identification information can be provided by the wireless client device to its carrier to associate such identification information to location of a wireless client device.

Further, by providing a pressure sensor 418 in the LAU 220 as shown in FIG. 4, the carrier 234 can also be configured to correlate pressure information between LAUs 220 in different buildings 1200, 1202, 1204, 1206 as shown in FIG. 12. For example, on a first day, the pressure sensors 418 in LAU 220 in buildings 1202, 1204, 1206 can be calibrated by a field engineer during a site walk. The carriers 234 can access LAU 220 reference barometric network on-demand. Then, the carrier 234 can correlate barometric pressure information received from a LAU 220 associated with a wireless communication device 210 to that of LAU 220 of known location within the respective building 1202, 1204, 1206 or another building 1202, 1204, 1206 in the vicinity of the building 1202, 1204, 1206 containing the LAU 220.

Note that any of the communications signals, bands, and services described herein may be RF communications signals, bands and services. Supported RF communications services in the WCSs disclosed herein can include any communications bands desired. Examples of communication services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915

MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDCS can be configured to support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

Figure 13:
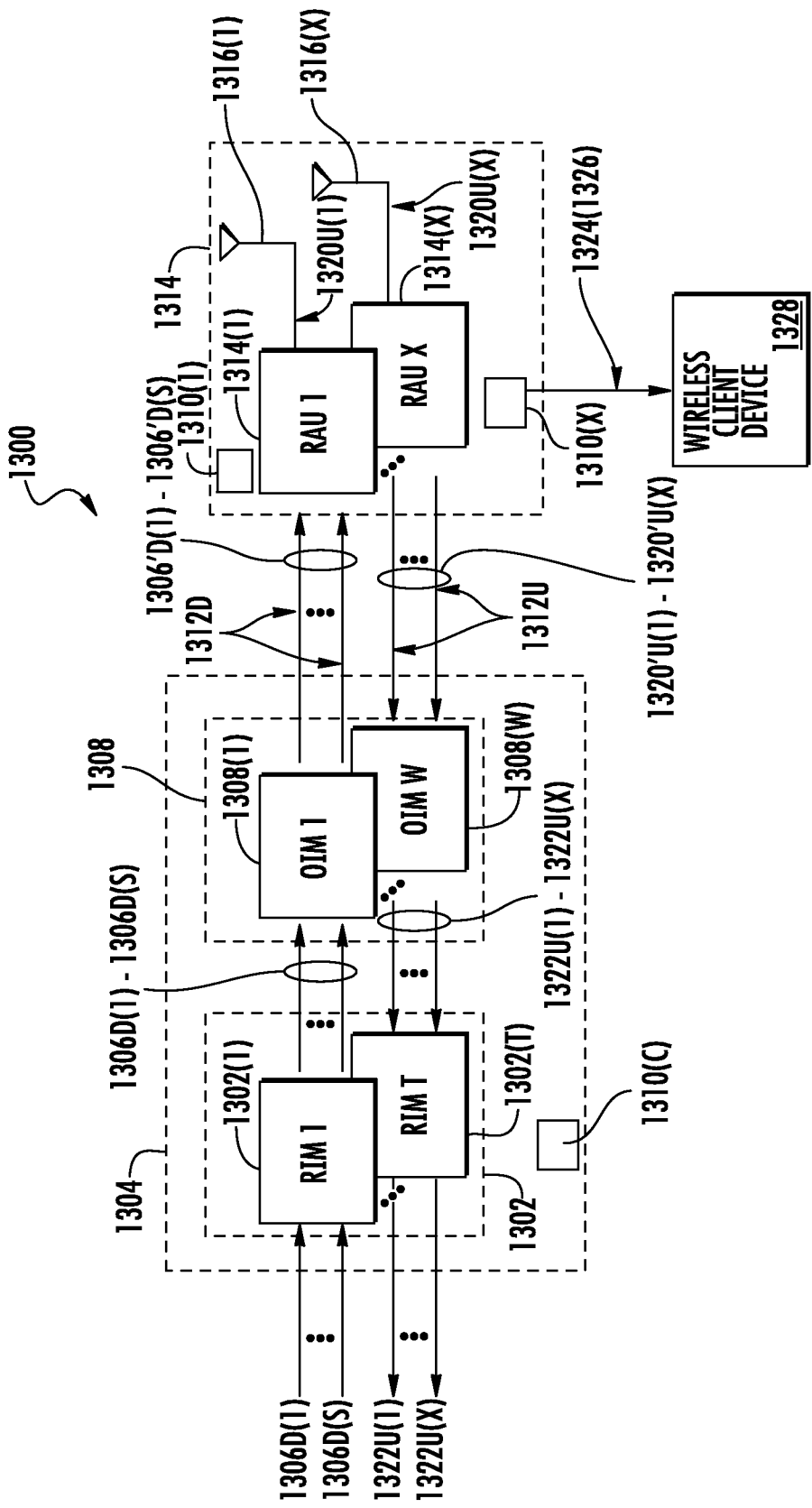
FIG. 13 is a schematic diagram of an exemplary optical-fiber based WCS in the form of a DAS configured to distribute wireless communications signals over optical fiber communication medium to the remote units and to wireless client devices communicating with the remote units, and wherein the WCS also includes exemplary LAUs each configured to transmit a local wireless communications signal containing identification information to a wireless client device in the WCS, wherein the identification can be provided by the wireless client device to its carrier to associate such identification information to location of a wireless client device.

A WCS can be configured to distribute wireless communications signals over optical fiber communication medium to the remote units and to wireless client devices communicating with the remote units, wherein the WCS also includes exemplary LAUs each configured to transmit a local wireless communications signal containing identification information to a wireless client device in the WCS, wherein the identification information can be provided by the wireless client device to its carrier to associate such identification information to location of a wireless client device can be provided as a DAS. In this regard, FIG. 13 is a schematic diagram of such an exemplary DAS 1300. The DAS 1300 in this example is an optical fiber-based DAS. The DAS 1300 in this example is comprised of three (3) main components. One or more radio interfaces provided in the form of radio interface modules (RIMs) 1302(1)-1302(T) are provided in a central unit 1304 to receive and process downlink electrical communications signals 1306D(1)-1306D(S) prior to optical conversion into downlink optical communications signals. The downlink electrical communications signals 1306D(1)-1306D(S) may be received from a base station (not shown) as an example. The RIMs 1302(1)-1302(T) provide both downlink and uplink interfaces for signal processing. The notations "1-S" and "1-T" indicate that any number of the referenced component, 1-S and 1-T, respectively, may be provided.

With continuing reference to FIG. 13, the central unit 1304 is configured to accept the plurality of RIMs 1302(1)-1302(T) as modular components that can easily be installed and removed or replaced in the central unit 1304. In one embodiment, the central unit 1304 is configured to support up to twelve (12) RIMs 1302(1)-1302(12). Each RIM 1302(1)-1302(T) can be designed to support a particular type of radio source or range of radio sources (i.e., frequencies) to provide flexibility in configuring the central unit 1304 and the DAS 1300 to support the desired radio sources. For example, one RIM 1302 may be configured to support the Personal Communication Services (PCS) radio band. Another RIM 1302 may be configured to support the 700 MHz radio band. In this example, by inclusion of these RIMs 1302, the central unit 1304 could be configured to support and distribute communications signals, including those for the communications services and communications bands described above as examples.

The RIMs 1302(1)-1302(T) may be provided in the central unit 1304 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 13, the downlink electrical communications signals 1306D(1)-1306D(S) may be provided to a plurality of optical interfaces provided in the form of optical interface modules (OIMs) 1308(1)-1308(W) convert the downlink electrical communications signals 1306D(1)-1306D(S) into downlink optical communications signals. The notation "1-W" indicates that any number of the referenced component 1-W may be provided. The OIMs 1308(1)-1308(W) may be configured to provide one or more optical interface components (OICs) that contain optical-to-electrical (O-E) and electrical-to-optical (E-O) converters, as will be described in more detail below. The OIMs 1308(1)-1308(W) support the radio bands that can be provided by the RIMs 1302, including the examples previously described above.

The OIMs 1308(1)-1308(W) each include E-O converters to convert the downlink electrical communications signals 1306D(1)-1306D(S) into the downlink optical communications signals 1306'D(1)-1306'D(S). The downlink optical communications signals 1306'D(1)-1306'D(S) are communicated over downlink optical fiber communications medium 1312D to a plurality of remote units provided in the form of remote antenna units 1314(1)-1314(X). The notation "1-X" indicates that any number of the referenced component 1-X may be provided. O-E converters provided in the remote antenna units 1314(1)-1314(X) convert the downlink optical communications signals 1306'D(1)-1306'D(S) back into the downlink electrical communications signals 1306D(1)-1306D(S), which are provided to antennas 1316(1)-1316(X) in the remote antenna units 1314(1)-1314(X) to user equipment (not shown) in the reception range of the antennas 1316(1)-1316(X).

E-O converters are also provided in the remote antenna units 1314(1)-1314(X) to convert uplink electrical communications signals 1320U(1)-1320U(X) received from user equipment (not shown) through the antennas 1316(1)-1316(X) into uplink optical communications signals 1320'U(1)-1320'U(X). The remote antenna units 1314(1)-1314(X) communicate the uplink optical communications signals 1320'U(1)-1320'U(X) over an uplink optical fiber communications medium 1312U to the OIMs 1308(1)-1308(W) in the central unit 1304. The OIMs 1308(1)-1308(W) include O-E converters that convert the received uplink optical communications signals 1320'U(1)-1320'U(X) into uplink electrical communications signals 1322U(1)-1322U(X), which are processed by the RIMs 1302(1)-1302(T) and provided as uplink electrical communications signals 1322U(1)-1322U(X). The central unit 1304 may provide the uplink electrical communications signals 1322U(1)-1322U(X) to a source transceiver such as a base station or other communications system.

The DAS 1300 also includes LAUs 1310(1)-1310(X), which in this example is the same number as the remote units 1314(1)-1314(X). The LAUs 1310(1)-1310(X) may be the LAUs 220 previously described above in FIGS. 2-5 and 7. In this example, the LAUs 1310(1)-1310(X) are associated with respective remote units 1314(1)-1314(X). The LAUs 1310(1)-1310(X) are each configured to transmit a local wireless communications signal 1324 containing identification information and/or pressure information 1326 to a wireless client device 1328 in the DAS 1300. The identification information 1326 can be provided by the wireless client device 1328 to its carrier to associate such identification information to location of a wireless client device 1328, including according to the previous examples described above.

Note that the downlink optical fiber communications medium 1312D and uplink optical fiber communications medium 1312U connected to each remote antenna unit 1314(1)-1314(X) may be a common optical fiber communications medium, wherein for example, wave division multiplexing (WDM) may be employed to provide the downlink optical communications signals 1306'D(1)-1306'D(S) and the uplink optical communications signals 1306'U(1)-1306'U(X) on the same optical fiber communications medium.

Figure 14:
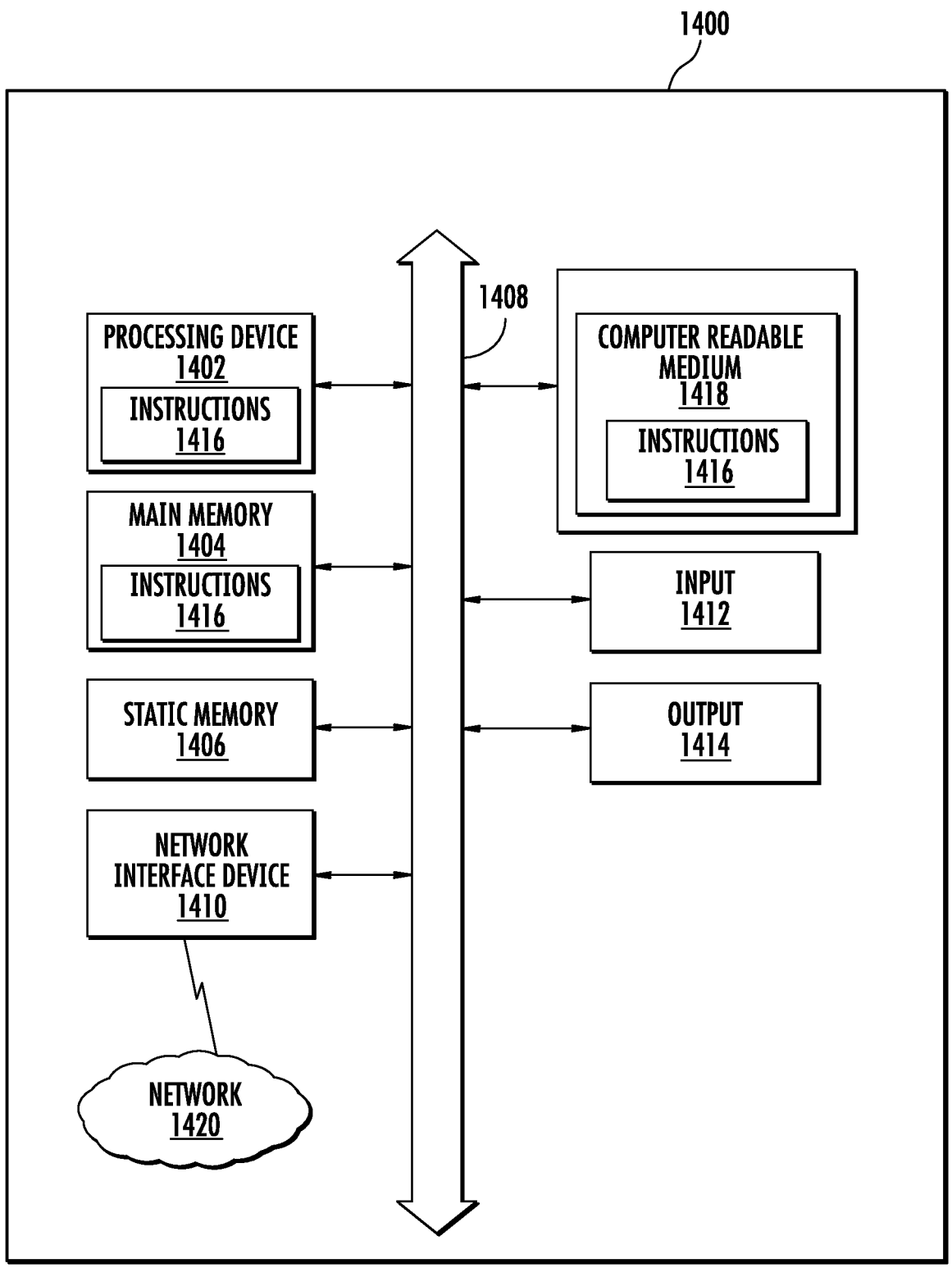
FIG. 14 is a schematic diagram of a generalized representation of an exemplary computer system that can be included in a LAU provided in a WCS, wherein the exemplary computer system is adapted to execute instructions from an exemplary computer readable medium.

FIG. 14 is a schematic diagram representation of additional detail illustrating a computer system 1400 that could be employed in any of the circuits in a WCS employing a LAU(s) configured to transmit a local wireless communications signal containing identification information to a wireless client device in the WCS, wherein the identification can be provided by the wireless client device to its carrier to associate such identification information to location of a wireless client device, including but not limited to the LAUs 220 in FIGS. 2-5 and 7. In this regard, the computer system 1400 is adapted to execute instructions from an exemplary computer-readable medium to perform these and/or any of the functions or processing described herein. The computer system 1400 in FIG. 14 may include a set of instructions that may be executed to program and configure a LAU to transmit a local wireless communications signal containing identification information to a wireless client device in the WCS, wherein the identification information can be provided by the wireless client device to its carrier to associate such identification information to location of a wireless client device. The computer system 1400 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1400 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1400 in this embodiment includes a processing device or processor 1402, a main memory 1404 (e.g., read-only memory (ROM), flash memory, dynamic random access memory (DRAM), such as synchronous DRAM (SDRAM), etc.), and a static memory 1406 (e.g., flash memory, static random access memory (SRAM), etc.), which may communicate with each other via a data bus 1408. Alternatively, the processor 1402 may be connected to the main memory 1404 and/or static memory 1406 directly or via some other connectivity means. The processor 1402 may be a controller, and the main memory 1404 or static memory 1406 may be any type of memory.

The processor 1402 represents one or more general-purpose processing devices, such as a microprocessor, central processing unit, or the like. More particularly, the processor 1402 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1402 is configured to execute processing logic in instructions for performing the operations and steps discussed herein The computer system 1400 may further include a network interface device 1410. The computer system 1400 also may or may not include an input 1412, configured to receive input and selections to be communicated to the computer system 1400 when executing instructions. The computer system 1400 also may or may not include an output 1414, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processor 1402 during execution thereof by the computer system 1400, the main memory 1404 and the processor 1402 also constituting computer-readable medium. The instructions 1416 may further be transmitted or received over a network 1420 via the network interface device 1410.

While the computer-readable medium 1418 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communications system (WCS), comprising:
   a central unit configured to:
      receive downlink cellular communications signals from at least one signal source;
      distribute the received downlink cellular communications signals over at least one downlink communications medium to at least one remote unit among a plurality of remote units;
      receive uplink wireless communications signals from the plurality of remote units over at least one uplink communications medium; and
      distribute the received uplink wireless communications signals to the at least one signal source;
   each remote unit among the plurality of remote units comprising at least one antenna and configured to:
      receive downlink cellular communications signals over the at least one downlink communications medium from the central unit;

transmit the received downlink cellular communications signals over the at least one antenna to a wireless client device;
receive uplink wireless communications signals over the at least one antenna from a wireless client device comprising an uplink wireless communications signal from the wireless client device comprising received identification information from a local access unit (LAU) at a known location among one or more LAUs, the LAU located in proximity with the remote unit communicating with the wireless client device; and
distribute the received uplink wireless communications signals comprising the received identification information in the uplink wireless communication signal received from the wireless client device over the at least one uplink communications medium as uplink communications signals to the central unit;
the one or more LAUs each located in proximity with a remote unit among the plurality of remote units, each LAU of the one or more LAUs comprising:
at least one antenna; and
one or more wireless transmitters coupled to the at least one antenna, each of the one or more wireless transmitters configured to transmit a wireless communications signal comprising the received identification information associated with the known location of the LAU to the wireless client device communicating with the remote unit associated with the LAU;
the WCS configured to determine a location of the wireless client device in proximity to the LAU by associating the received identification information of the LAU received by the remote unit in the received uplink wireless communications signals with the wireless client device.

2. The WCS of claim 1, wherein each remote unit associated with a LAU among the one or more LAUs is configured to receive the uplink wireless communications signals further comprising:
a second uplink wireless communications signal from the wireless client device comprising a request to establish a location-based communication session with a signal source among the at least one signal source.

3. The WCS of claim 1, wherein each remote unit associated with a LAU among the one or more LAUs is further configured to receive the downlink cellular communications signals comprising:
a first downlink cellular communications signal instructing the wireless client device to scan for the wireless communications signal from a LAU comprising identification information associated with the location of the LAU.

4. The WCS of claim 2, wherein the location-based communication session is an emergency 911 (E911) call.

5. The WCS of claim 2 further configured to look up location information of the LAU associated with the remote unit communicating with the wireless client device, in a location database based on identification information in the second uplink wireless communications signal received from the wireless client device.

6. The WCS of claim 5 further comprising the location database.

7. The WCS of claim 6, wherein the central unit comprises the location database.

8. The WCS of claim 6, wherein the location database comprises a NEAD database.

9. The WCS of claim 1, wherein the one or more wireless transmitters are not configured to connect to a network.

10. The WCS of claim 1, wherein a wireless transmitter among the one or more wireless transmitters comprises a WiFi transmitter.

11. The WCS of claim 10, wherein the identification information comprises an identifier comprised from the group consisting of a service set identifier (BSSID).

12. The WCS of claim 1, wherein a wireless transmitter among the one or more wireless transmitters comprises a Bluetooth transmitter.

13. The WCS of claim 12, wherein the identification information is comprised form the group consisting of universal unique identification (UUID) and a Bluetooth media access control (MAC) address.

14. The WCS of claim 1, wherein a wireless communication range of the one or more LAUs is substantially the same as the remote unit associated with the LAU among the one or more LAUs.

15. The WCS of claim 1, wherein at least one LAU among the one or more LAUs further comprises a pressure sensor configured to generate a pressure signal indicative of barometric pressure of the at least one LAU;
the at least one LAU configured to distribute pressure information associated with the pressure signal to the central unit to be provided to a carrier.

16. The WCS of claim 15, wherein:
each remote unit associated with a LAU among the one or more LAUs is configured to receive the uplink wireless communications signals comprising a second uplink wireless communications signal from the wireless client device comprising a request to establish a location-based communication session with a signal source among the at least one signal source; and
the at least one LAU is configured to:
receive a second downlink cellular communications signal from the carrier comprising a request for the pressure information for the wireless client device communicating with the remote unit associated with the at least one LAU; and
distribute the pressure information from the LAU associated with the wireless client device communicating with the remote unit in the second uplink wireless communications signal to the central unit to be distributed to the carrier.

17. The WCS of claim 16, further comprising a central LAU associated with the central unit, the central LAU comprising a pressure sensor configured to generate a central pressure signal indicative of barometric pressure of the central LAU, the central LAU configured to transmit central pressure information;
the central LAU configured to receive a downlink cellular communications signal from the carrier comprising a request for the central pressure information from the central LAU.

18. The WCS of claim 1, wherein:
each LAU of the one or more LAUs further comprises an input power port; and
the remote unit among the plurality of remote units associated with each LAU among the one or more LAUs comprises an output power port configured to be electrically coupled to the input power port to provide power to the associated LAU.

19. The WCS of claim 18, wherein:
each input power port of the one or more LAUs comprises a power-over-Ethernet port; and each output power port of the remote unit associated with a LAU among the one or more LAUs comprises a power-over-Ethernet port.

20. A wireless communications system (WCS), comprising:
a central unit configured to:
receive downlink cellular communications signals from at least one signal source;
distribute the received downlink cellular communications signals over at least one optical downlink communications medium to at least one remote unit among a plurality of remote units;
receive uplink wireless communications signals from the plurality of remote units over at least one uplink communications medium; and
distribute the received uplink wireless communications signals to the at least one signal source;
each remote unit among the plurality of remote units comprising at least one antenna and configured to:
receive downlink cellular communications signals over the at least one optical downlink communications medium from the central unit;
transmit the received downlink cellular communications signals over the at least one antenna to a wireless client device;
receive uplink wireless communications signals over the at least one antenna from a wireless client device comprising an uplink wireless communications signal from the wireless client device comprising received identification information from a local access unit (LAU) at a known location among one or more LAUs, the LAU located in proximity with the remote unit communicating with the wireless client device; and
distribute the received uplink wireless communications signals comprising the received identification information in the uplink wireless communication signal received from the wireless client device over the at least one uplink communications medium as uplink communications signals to the central unit;
the one or more LAUs each located in proximity with a remote unit among the plurality of remote units, each LAU of the one or more LAUs comprising:
at least one antenna; and
one or more wireless transmitters coupled to the at least one antenna, each of the one or more wireless transmitters configured to transmit a wireless communications signal comprising the received identification information associated with the known location of the LAU to the wireless client device communicating with the remote unit associated with the LAU, wherein
the WCS configured to determine a location of the wireless client device in proximity to the LAU.

21. The WCS of claim 20, wherein each remote unit associated with a LAU among the one or more LAUs is configured to receive the uplink wireless communications signals further comprising:
a second uplink wireless communications signal from the wireless client device comprising a request to establish a location-based communication session with a signal source among the at least one signal source.

22. The WCS of claim 20, wherein each remote unit associated with a LAU among the one or more LAUs is further configured to receive the downlink cellular communications signals comprising:
a first downlink cellular communications signal instructing the wireless client device to scan for the wireless communications signal from a LAU comprising identification information associated with the location of the LAU.

23. The WCS of claim 20, wherein at least one LAU among the one or more LAUs further comprises a pressure sensor configured to generate a pressure signal indicative of barometric pressure of the at least one LAU;
the at least one LAU configured to distribute pressure information associated with the pressure signal to the central unit to be provided to a carrier.

24. The WCS of claim 20, wherein:
each LAU of the one or more LAUs further comprises an input power port; and
the remote unit among the plurality of remote units associated with each LAU among the one or more LAUs comprises an output power port configured to be electrically coupled to the input power port to provide power to the associated LAU.

* * * * *